US012644547B1

(12) United States Patent
Larson et al.

(10) Patent No.: US 12,644,547 B1
(45) Date of Patent: Jun. 2, 2026

(54) PIPE FITTING WITH ASSEMBLY WINDOW

(71) Applicant: Mueller International, LLC, Atlanta, GA (US)

(72) Inventors: Ryan Fairchild Larson, Decatur, IL (US); Timothy Wayne Stern, Hixon, TN (US); David Latimore Hughes, Jr., Signal Mountain, TN (US)

( * ) Notice: Subject to any disclaimer, the term of this patent is extended or adjusted under 35 U.S.C. 154(b) by 0 days.

(21) Appl. No.: 18/981,036

(22) Filed: Jan. 9, 2025

(51) Int. Cl.
*F16L 21/06* (2006.01)

(52) U.S. Cl.
CPC .................................. *F16L 21/065* (2013.01)

(58) Field of Classification Search
CPC ......... F16L 21/03; F16L 21/065; F16L 21/08;
F16L 21/022; F16L 21/007; F16L 17/02;
F16L 17/04; F16L 25/04; F16L 25/06;
F16L 25/065; F16L 47/12; F16L 47/06;
F16L 47/08; F16L 55/17; F16L 55/1705;
F16L 55/171; F16L 55/172; F16L 33/08;
F16L 33/04; F16L 33/06; F16L 33/085;
F16L 33/10; F16L 33/222; F16L 37/0925;
F16L 37/092; F16L 37/123
See application file for complete search history.

(56) References Cited

U.S. PATENT DOCUMENTS

| | | | |
|---|---|---|---|
| 1,898,623 A | 2/1933 | Gammeter |
| 2,508,914 A | 5/1950 | Graham |
| 3,429,587 A | 2/1969 | Kish |
| 3,486,777 A | 12/1969 | Bird |
| 3,733,093 A | 5/1973 | Seiler |
| 3,843,167 A | 10/1974 | Gronstedt |
| 3,860,270 A | 1/1975 | Arnold |
| 3,915,480 A | 10/1975 | Kish et al. |
| 3,999,782 A | 12/1976 | Shotbolt et al. |
| 4,466,640 A | 8/1984 | Van Houtte |
| 4,786,087 A | 11/1988 | Thewlis et al. |
| 5,160,175 A | 11/1992 | Yang |
| 5,335,946 A | 8/1994 | Dent et al. |
| 6,447,018 B1 | 9/2002 | Ball |
| 7,004,511 B2 | 2/2006 | Barron et al. |
| 7,063,356 B2 | 6/2006 | Barker |

(Continued)

FOREIGN PATENT DOCUMENTS

| | | |
|---|---|---|
| DE | 29724671 | 11/2002 |
| EP | 0870967 | 10/1998 |

(Continued)

OTHER PUBLICATIONS

Larson, Ryan Fairchild; Requirement for Restriction/Election for U.S. Appl. No. 18/922,536, filed Oct. 22, 2024, mailed Oct. 14, 2025, 8 pgs.

(Continued)

*Primary Examiner* — Aaron M Dunwoody
(74) *Attorney, Agent, or Firm* — Smith, Gambrell & Russell LLP

(57) ABSTRACT

A pipe fitting includes a fitting body defining an inner body surface, an outer body surface, a first axial fitting end, and a second axial fitting end, the inner body surface defining a fitting bore extending from the first axial fitting end to the second axial fitting end, and an assembly window extending through the fitting body from the outer body surface to the inner body surface.

19 Claims, 20 Drawing Sheets

(56) References Cited

U.S. PATENT DOCUMENTS

| | | | | |
|---|---|---|---|---|
| 7,552,949 | B2 * | 6/2009 | Riordan, III | F16L 37/26 |
| | | | | 285/252 |
| 11,566,732 | B2 | 1/2023 | Furcoiu et al. | |
| 12,595,866 | B1 | 4/2026 | Larson et al. | |
| 2010/0148489 | A1 * | 6/2010 | Pohn | F16L 47/03 |
| | | | | 285/21.2 |
| 2024/0117905 | A1 | 4/2024 | Huddleston | |

FOREIGN PATENT DOCUMENTS

| | | | |
|---|---|---|---|
| KR | 20100046355 | A | 5/2010 |
| KR | 20110127476 | A | 11/2011 |
| KR | 20190053647 | | 5/2019 |

OTHER PUBLICATIONS

Larson, Ryan Fairchild; Non-Final Office Action for U.S. Appl. No. 18/977,598, filed Dec. 11, 2024, mailed Sep. 23, 2025, 17 pgs.

Larson, Ryan Fairchild; Requirement for Restriction/Election for U.S. Appl. No. 18/977,598, filed Dec. 11, 2024, mailed Aug. 15, 2025, 9 pgs.

Larson, Ryan Fairchild; Non-Final Office Action for U.S. Appl. No. 18/953,870, filed Nov. 20, 2024, mailed Aug. 15, 2025, 16 pgs.

Larson, Ryan Fairchild; Notice of Allowance for U.S. Appl. No. 18/953,870, filed Nov. 20, 2024, mailed Dec. 3, 2025, 11 pgs.

Larson, Ryan Fairchild; Final Office Action for U.S. Appl. No. 18/977,598, filed Dec. 11, 2024, mailed Jan. 21, 2026, 17 pgs.

Larson, Ryan Fairchild; Non-Final Office Action for U.S. Appl. No. 18/922,536, filed Oct. 22, 2024, mailed Jan. 30, 2026, 27 pgs.

* cited by examiner

3/20

PIPE FITTING WITH ASSEMBLY WINDOW

TECHNICAL FIELD

This disclosure relates to pipe fittings. More specifically, this disclosure relates to a pipe fitting comprising an assembly window.

BACKGROUND

A fluid piping system can comprise piping components (e.g., pipe segments, valves, etc.) that can be joined together with pipe fittings. In some aspects, the pipe fitting can comprise an end ring, a gasket, and a grip ring. The pipe fitting can be tightened to bias the gasket and the grip ring against an outer surface of the pipe segments (or other piping components). However, the end ring of the pipe fitting can be heavy, can be somewhat inflexible, and can compress unevenly when tightened. As such, a high torque is required to tighten the pipe fitting sufficiently. In some instances, the pipe fitting can crush the pipe segments during tightening.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

In one aspect of the present disclosure, a pipe fitting can include a fitting body that can define an inner body surface, an outer body surface, a first axial fitting end, and a second axial fitting end, the inner body surface can define a fitting bore extending from the first axial fitting end to the second axial fitting end, an assembly window can extend through the fitting body from the outer body surface to the inner body surface; and a clamp assembly that can be arranged at least partially within the fitting bore and can comprise a first fastener catch, a second fastener catch, and a tightening fastener, each of the first fastener catch and the second fastener catch can be arranged within the assembly window; wherein the clamp assembly can be configurable in an untightened configuration and a tightened configuration; and wherein, in the tightened configuration, the tightening fastener can be tightened to draw the first fastener catch towards the second fastener catch.

In another aspect of the present disclosure, a fitting body for use to join a clamp assembly to a pipe can include a substantially cylindrical tubular body having an axis, a first axial fitting end, and a second axial fitting end, the body can define an outer body surface; a fitting bore can be defined by the body, the fitting bore can be defined through an entirety of the body from the first axial fitting end to the second axial fitting end, the fitting bore can define an inner body surface of the body, the body can include at least one wall defined by the inner body surface and the outer body surface; at least one assembly window that can be define through the wall of the body.

In another aspect of the present disclosure, a pipe fitting can include a fitting body that can define a fitting bore and an assembly window; and a clamp assembly that can be arranged at least partially within the fitting bore and can include: a fitting clamp that can include a flexible C-shaped clamp body, a first fastener catch, and a second fastener catch, the clamp body can define a clamp void, the first fastener catch and the second fastener catch that can extend radially outwardly through the assembly window; a flexible C-shaped grip ring that can be arranged within the clamp void and can define a plurality of gripping ridges; and a gasket that can be arranged within the clamp void and can define a gasket sealing surface.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
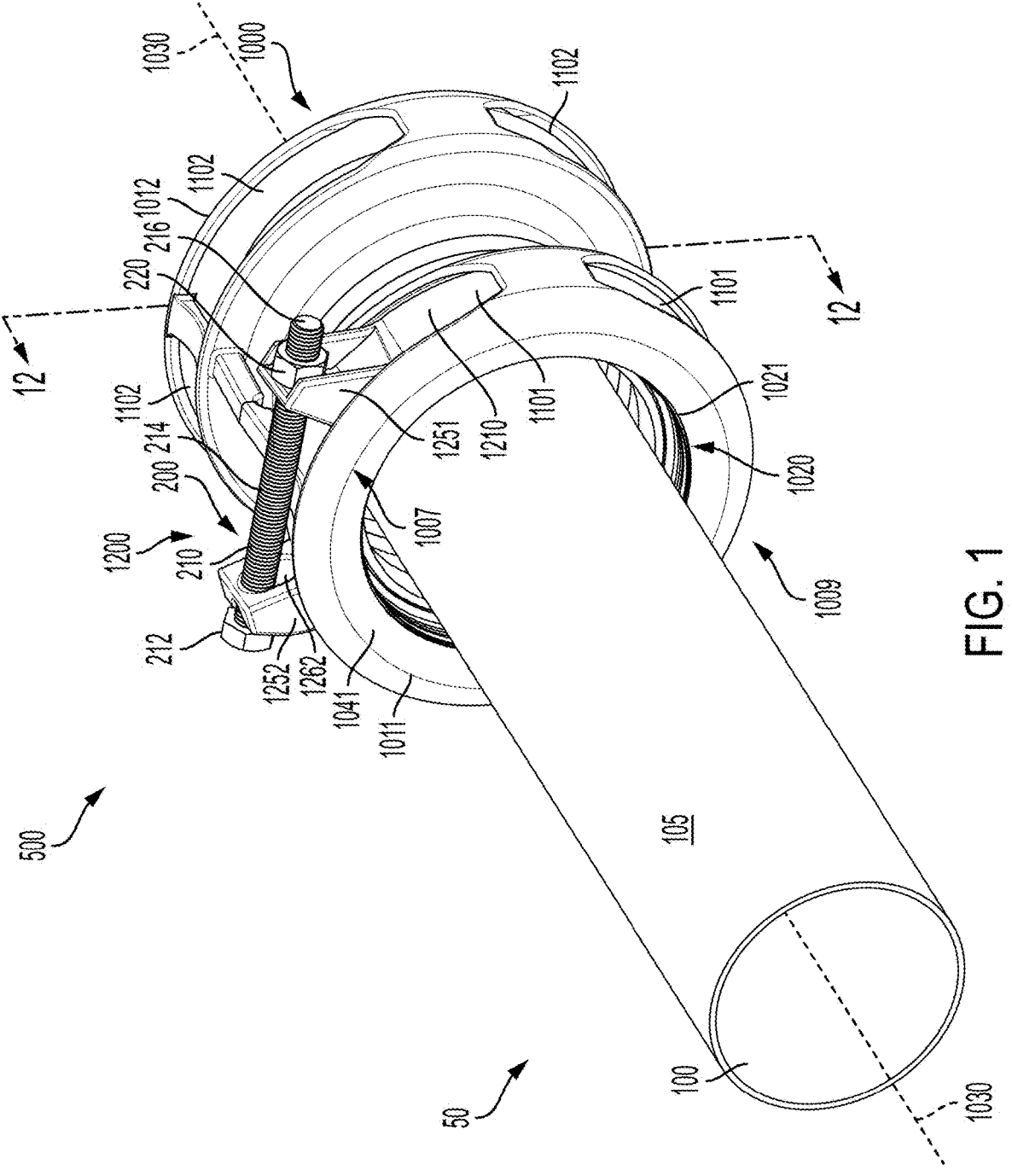
FIG. 1 is a perspective view of a pipe fitting coupled to a pipe segment in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a pipe fitting and associated methods, systems, devices, and various apparatus. Example aspects of the pipe fitting can comprise a fitting body comprising an assembly window. It would be understood by one of skill in the art that the pipe fitting is described in but a few exemplary embodiments among many. No particular terminology or description should be considered limiting on the disclosure or the scope of any claims issuing therefrom.

FIG. 1 is a perspective view of a pipe fitting 500 in accordance with one aspect of the present disclosure. The pipe fitting 500 can be configured to join together two or more piping components 50, which can include, for example and without limitation, pipe segments 100 (as shown), valves, elbows, end caps, tees, and the like. Pipe segments 100 can be substantially tubular and can define a substantially cylindrical outer pipe surface 105.

The pipe fitting 500 can comprise a fitting body 1000. Example aspects of the fitting body 1000 can define a substantially tubular shape. The fitting body 1000 can be substantially cylindrical in various aspects. The fitting body 1000 can define a first axial fitting end 1011 and a second axial fitting end 1012 disposed opposite the first axial fitting end 1011. A fitting bore 1020 can be defined by and extend through the fitting body 1000 from the first axial fitting end 1011 to the second axial fitting end 1012. The fitting bore 1020 can define a first bore opening 1021 at the first axial fitting end 1011 and a second bore opening 1022 (seen with reference to FIG. 9B) at the second axial fitting end 1012. A fitting axis 1030 (seen with reference to FIGS. 9A-9B) can be defined centrally through the fitting bore 1020. One or more first assembly windows 1101 can be defined by and formed through the fitting body 1000 proximate to the first axial fitting end 1011, and one or more second assembly windows 1102 can be formed through the fitting body 1000 proximate to the second axial fitting end 1012.

Example aspects of the pipe fitting 500 can further comprise one or more clamp assemblies 1200. For example, in some aspects, a first one of the clamp assemblies 1200 can be arranged proximate to the first axial fitting end 1011, and a second one of the clamp assemblies 1200 can be arranged proximate to the second axial fitting end 1012. In the present view, one of the clamp assemblies 1200 is shown, which can be arranged proximate to the first axial fitting end 1011. According to example aspects, the fitting body 1000 can define a first retention shoulder 1041 extending radially inwardly at the first axial fitting end 1011. The first retention shoulder 1041 can be configured to retain one of the clamp assemblies 1200 within the fitting bore 1020 to prevent axial movement of the clamp assembly 1200 with respect to the fitting body 1000. Similarly, the fitting body 1000 can define a second retention shoulder 1042 (seen with reference to FIG. 9B) extending radially inwardly at the second axial fitting end 1022.

The clamp assembly 1200 can be configured to clamp onto the pipe segment 100 and can promote a mechanical connection between the pipe fitting 500 and the pipe segment 100. According to example aspects, the clamp assembly 1200 can comprise a fitting clamp 1210, a grip ring 1220 (seen with reference to FIG. 2), and a fitting gasket 1230 (seen with reference to FIG. 2). The fitting clamp 1210 can comprise a substantially C-shaped clamp body 1240 defining a first circumferential clamp end 1241 (seen with reference to FIGS. 2, 3A, and 3B) and a second circumferential clamp end 1242 (seen with reference to FIGS. 2, 3A, and 3B). The clamp body 1240 can be arranged within a first clamp groove 1911 (seen with reference to FIG. 9B), which can be a portion of the fitting bore 1020 adjacent to the first axial fitting end 1011. The fitting clamp 1210 can further comprise a first fastener catch 1251 that can extend radially outwardly from the clamp body 1240 at the first circumferential clamp end 1241 and a second fastener catch 1252 that can extend radially outwardly from the clamp body 1240 at the second circumferential clamp end 1242. Each of the first fastener catch 1251 and the second fastener catch 1252 can extend through a corresponding one of the first assembly windows 1101. For example, in the present aspect, each of the first fastener catch 1251 and the second fastener catch 1252 can engage an first assembly window 1101 on an upper portion 1007 of the fitting body 1000. The upper portion 1007 can be referenced as the portions of the fitting body 1000 that is above the fitting axis 1030 when oriented in assembly as seen with reference to FIG. 1. A lower portion 1009 of the fitting body 1000 can be referenced as the portions of the fitting body 1000 that is below the fitting axis 1030 when oriented in assembly as seen with reference to FIG. 1. First assembly windows 1101 defined in the upper portion 1007 can be termed first upper assembly windows 1101a in various aspects. First assembly windows 1101 on the lower portion 1009 can be termed first lower assembly windows 1101b in various aspects. Similarly, second assembly windows 1102 defined in the upper portion 1007 can be termed second upper assembly windows 1102a in various aspects. Second assembly windows 1102 on the lower portion 1009 can be termed second lower assembly windows 1102b in various aspects.

A tightening fastener 200 can engage each of the first fastener catch 1251 and the second fastener catch 1252. The tightening fastener 200 can comprise, for example and without limitation, a fastener bolt 210 and a fastener nut 220 threadedly mounted to the fastener bolt 210. The fastener bolt 210 can define a bolt head 212 and a bolt shaft 214. The bolt head 212 can abut the first fastener catch 1251, and the bolt shaft 214 can extend through a first bolt hole 1261 formed in the first fastener catch 1251 and a second bolt hole 1262 formed in the second fastener catch 1252. The fastener nut 220 can be threaded onto the bolt shaft 214 at a distal shaft end 216 thereof, opposite the bolt head 212. In other aspects, the tightening fastener 200 can be any other suitable fastener known in the art. In the current aspect, the bolt head 212 can be arranged proximate the second fastener catch 1252 and the fastener nut 220 can be arranged proximate the first fastener catch 1251. In various aspects, the orientation of the tightening fastener 200 can be reversed or rearranged as would be understood by one of skill in the art.

The first fastener catch 1251 can comprise a first catch arm 2251 and a second catch arm 2252 arranged in facing relationship. The first catch arm 2251 can be axially aligned with the first axial clamp end 1243. In various aspects, the first catch arm 2251 can be about coincident with a plane defined by the first axial clamp end 1243. The second catch arm 2252 can be axially aligned with the second axial clamp end 1244. In various aspects, the second catch arm 2252 can be about coincident with a plane defined by the second axial clamp end 1244. A spacing 2253 can be defined between the first catch arm 2251 and the second catch arm 2252. The spacing 2253 can be defined such that the fastener nut 220 can become trapped between the first catch arm 2251 and the second catch arm 2252, thereby allowing the first fastener catch 2251 to provide anti-rotation torque onto the fastener nut 220.

The first fastener catch 1251 can comprise a catch base 2255 proximate the first circumferential clamp end 1241. The catch base 2255 can connect the first catch arm 2251 with the second catch arm 2252. The catch base 2255 can comprise a catch face 2257. The catch face 2257 in various aspects can comprise a bulge such that a top end 2258 and a bottom end 2259 of the catch base 2255 are thinner in the circumferential direction than a middle 2260 of the catch base 2255. As such, the catch base 2255 can comprise a convex surface that can help keep the fastener nut 220 aligned with the fastener bolt 210 to reduce shear and bending forces on the fastener bolt 210. In various aspects, the features of the catch base 2255 outlined herein can be accomplished by a flat surface and a convex washer being inserted.

The clamp assembly 1200 can be tightened by rotating the fastener nut 220 on the bolt shaft 214 to advance the fastener nut 220 towards the bolt head 212 and to abut the fastener nut 220 against the first fastener catch 1251. As the tightening fastener 200 tightens, the clamp body 1240 can flex to allow the first faster catch 1251 and the second fastener catch 1252 arranged between the bolt head 212 and the fastener nut 214 to be biased towards one another within the first upper assembly window 1101, and a clamp diameter $D_c$ (seen with reference to FIG. 3A) of the clamp body can be reduced, as described in further detail below.

Figure 2:
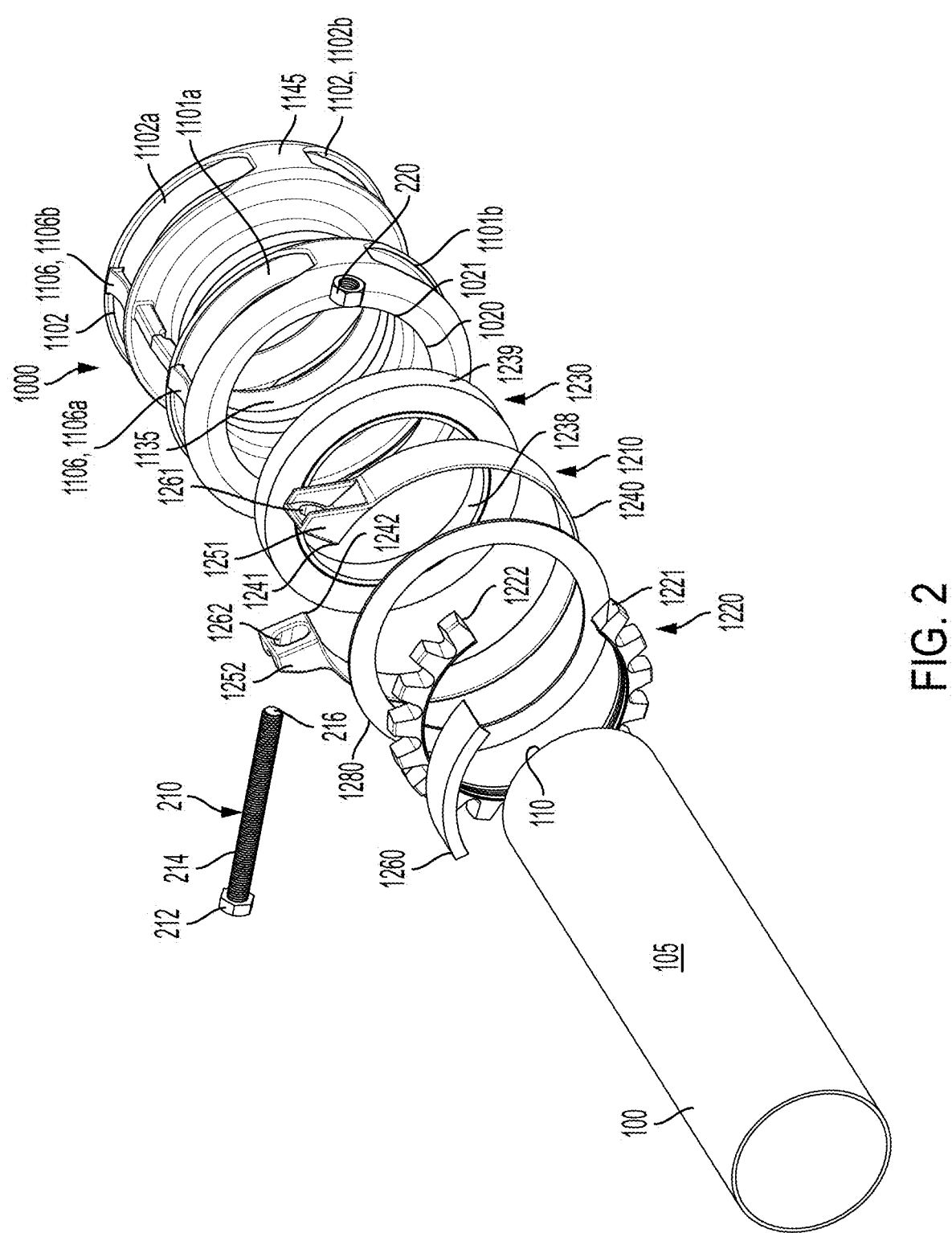
FIG. 2 is an exploded view of the pipe fitting of FIG. 1.

FIG. 2 illustrates an exploded view of the pipe fitting 500 and the pipe segment 100. As shown, the pipe segment 100 can define the substantially cylindrical outer pipe surface 105. The pipe fitting 500 can comprise the fitting body 1000 and the clamp assembly 1200. The fitting body 1000 can define an inner body surface 1135 and an outer body surface 1145 opposite the inner body surface 1135. The inner body surface 1135 can define the fitting bore 1020 extending through the fitting body 1000 from the first axial fitting end 1011 to the second axial fitting end 1012. The fitting body 1000 can define at least one wall having a thickness as measured from the inner body surface 1135 to the outer body surface 1145. The fitting bore 1020 can define the fitting axis 1030 extending centrally therethrough. A pipe end 110 of the pipe segment 100 can be inserted into the fitting bore 1012 through the first bore opening 1021.

The fitting body 1000 can further define at least one assembly window 1101,1102. In the present aspect, the assembly windows 1101,1102 can include the first upper assembly window 1101a and the first lower assembly window 1101b formed proximate to the first axial fitting end 1011 and a second upper assembly window 1102a and a second lower assembly window 1102b formed proximate to the second axial fitting end 1012. An upper reinforcing rib 1106 can axially traverse each of the first upper assembly window 1101a and the second upper assembly window 1102a to reinforce the fitting body 1000 at the locations of the upper assembly windows 1101a, 1102a. A lower reinforcing rib 1107 (seen with reference to FIG. 9) can similarly axially traverse each of the first lower assembly window 1101b and second lower assembly windows 1102b. Each of the first assembly windows 1101 can thereby be sectioned by one of the upper reinforcing rib 1106 or the lower reinforcing rib 1107 into a first window section 1181 (seen with reference to FIG. 9A as 1181a, 1181b) and a second window section 1191 (seen with reference to FIG. 9A as 1191a, 1191b). Each of the second assembly windows 1102 can similarly be sectioned by one of the upper reinforcing rib 1106 or the lower reinforcing rib 1107 into a first window section 1182 (seen with reference to FIG. 9A as 1182a, 1182b) and a second window section 1192 (seen with reference to FIG. 9A as 1192a; 1192b not seen in the view of FIG. 9A).

The clamp assembly 1200 can comprise the fitting clamp 1210, the grip ring 1220, and the fitting gasket 1230. Some aspects of the clamp assembly 1200 can further comprise a gasket bridge 1260 and/or a clamp washer 1280, as shown. The fitting clamp 1210 can comprise the clamp body 1240, the first fastener catch 1251, and the second fastener catch 1252. A clamp gap 1254 (seen with reference to FIG. 3A) can be defined between the first circumferential clamp end 1241 and the second circumferential clamp end 1242. The fitting clamp 1210 can further comprise the tightening fastener 200. The first fastener catch 1251 can engage the first window section 1181a of the first upper assembly window 1101a, and the second fastener catch 1252 can engage the second window section 1191a of the of the first upper assembly window 1101a. In some aspects, the upper reinforcing rib 1106 traversing the first upper assembly window 1101a can serve as a stop for each of the first fastener catch 1251 and the second fastener catch 1252 as the tightening fastener 200 tightens as the first fastener catch 1251 can be drawn toward the second fastener catch 1252.

The grip ring 1220 can be arranged substantially within a clamp void 1247 (seen with reference to FIGS. 3A and 3B) defined by an inner clamp surface 1245 (seen with reference to FIG. 3B) of the clamp body 1240. Example aspects of the grip ring 1220 can be substantially C-shaped, as shown. The grip ring 1220 can define a first circumferential ring end 1221 and a second circumferential ring end 1222. A ring gap 1227 (seen with reference to FIGS. 4A and 4C) can be defined between the first circumferential ring end 1221 and the second circumferential ring end 1222. The grip ring 1220 can further define a radially inward ring end 1228 (seen with reference to FIGS. 4A and 4C) and a radially outward ring end 1229 (seen with reference to FIGS. 4A and 4C), relative to the fitting axis 1030.

The grip ring 1220 can comprise a flexible, resilient material, such as a flexible metal material, such that the grip ring 1220 can deform during tightening of the clamp assembly 1200. For example, the flexible metal material can be steel, and specifically stainless steel in some aspects. The flexible metal material can be ductile iron in various aspects. The material of the grip ring 1200 can define a strength sufficient for gripping pipe segments 100 (or other piping components) of varying materials, including metal and plastic pipe segments, among others. In other aspects, the grip ring 1220 can be formed from other metal materials, plastics, composites, or any other material known in the art having suitable strength for gripping piping components of varying materials.

An outer ring surface 1226 (seen with reference to FIGS. 4A and 4C) can be formed at the radially outward end 1229 of the grip ring 1220. In example aspects, the grip ring 1220 can define a plurality of ring relief notches 1290 (seen with reference to FIG. 4A) extending into the outer ring surface 1226. The ring relief notches 1290 can be substantially evenly spaced circumferentially about the grip ring 1220. The ring relief notches 1290 can extend through an entirety of the grip ring 1220. The flexible material of the grip ring 1220 and the ring relief notches 1290 can allow the grip ring 1220 to flex during tightening of the pipe fitting 500 thereby allowing the first circumferential ring end 1241 to travel toward the second circumferential ring end 1242, decreasing an inner ring diameter $D_r$ (seen with reference to seen with reference to FIG. 4A) of the grip ring 1220.

In example aspects, the grip ring 1220 can further define an inner ring surface 1291 (seen with reference to FIGS. 4B and 4C) formed at the radially inward ring end 1228 thereof. The inner ring surface 1291 can define a plurality of circumferential gripping teeth 1295 or gripping ridges (seen with reference to FIGS. 4B and 4C). In assembly, the clamp assembly 1200 can be tightened and the inner ring diameter $D_r$ can be reduced by deformation of the grip ring 1220, and the gripping ridges 1295 can engage with and bite into the outer pipe surface 105 of the corresponding pipe segment 100.

The fitting gasket 1230 can also be arranged substantially within the clamp void 1247 of the fitting clamp 1210, adjacent to the grip ring 1220. The grip ring 1220 can be positioned axially between the first axial fitting end 1011 of the fitting body 1000 and the fitting gasket 1230. In example aspects, the fitting gasket 1230 can comprise a flexible and resilient material, such as a rubber, for example and without limitation. The fitting gasket 1230 can be substantially annular, as shown. The fitting gasket 1230 can define an outer gasket surface 1239 and an inner gasket surface 1238 (also seen with reference to FIGS. 5A and 5B). The inner gasket surface 1238 can also be termed a gasket sealing surface 1238 configured to seal against the outer pipe surface 105 of the pipe segment 100. In the present aspect, both the outer gasket surface 1239 and the gasket sealing surface 1238 can be substantially smooth. In the tightened configuration, the fitting gasket 1230 can be compressed radially inwardly by the flexing clamp body 1240 to contact and to seal the gasket sealing surface 1238 against the outer pipe surface 105 of the pipe segment 100.

Example aspects of the clamp assembly 1200 can further comprise the clamp washer 1280 and/or the gasket bridge 1260. The clamp washer 1280 can be arranged axially between the grip ring 1220 and the gasket 1230. The clamp washer 1280 can be a standard, annular flat washer, for example and without limitation. The clamp washer 1280 can prohibit the fitting gasket 1230 from extruding axially into or through the ring gap 1227 of the grip ring 1220. The gasket bridge 1260 can be substantially arcuate.

Figure 8A:
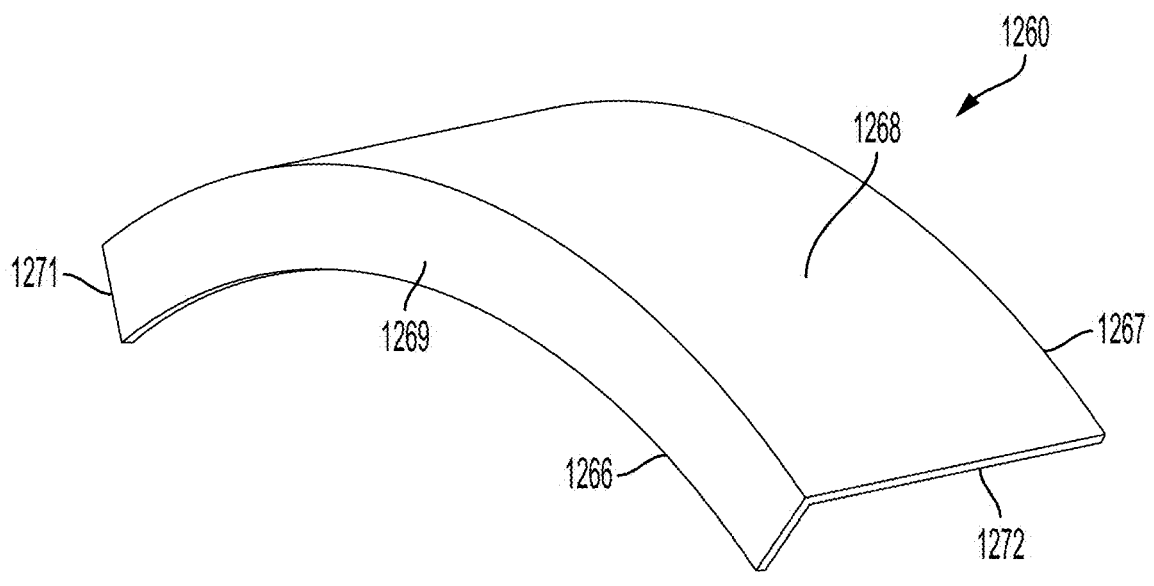
FIG. 8A is a perspective view of a gasket bridge of the pipe fitting of FIG. 1.
Figure 8B:
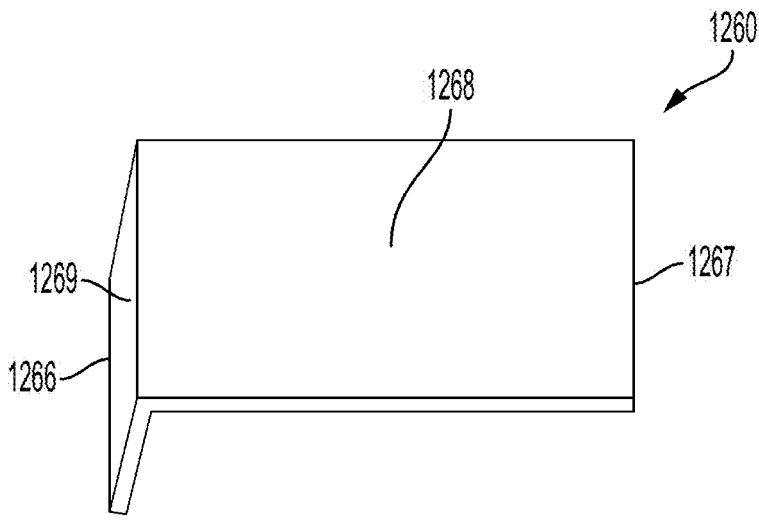
FIG. 8B is a side view of the gasket bridge of FIG. 8A.

With reference to FIGS. 8A and 8B, the gasket bridge 1260 can define a first axial bridge end 1266 and a second axial bridge end 1267 opposite the first axial bridge end 1266. The gasket bridge 1260 can comprise an arcuate axial bridge wall 1268 extending between the first axial bridge end 1266 and the second axial bridge end 1267. The gasket bridge 1260 can comprise an arcuate radial bridge shoulder 1269 extending substantially radially inwardly from the axial bridge wall 1268 at the first axial bridge end 1266.

With returning reference to FIGS. 1 and 2, the axial bridge wall 1268 of the gasket bridge 1260 can be positioned radially between the outer gasket surface 1239 of the fitting gasket 1230 and the inner clamp surface 1245 of the clamp body 1240. The axial bridge wall 1268 can be arranged to span the clamp gap 1254 of the fitting clamp 1210 to prohibit the fitting gasket 1230 from extruding radially outwardly into or through the clamp gap 1254. In some aspects, portions of the axial bridge wall 1268 can further be positioned radially between the grip ring 1220 and clamp body 1240 and radially between the clamp washer 1280 and the clamp body 1240. The radial bridge shoulder 1269 can be arranged axially between the first retention shoulder 1041 of the fitting body 1000 and the grip ring 1220.

Figure 3A:
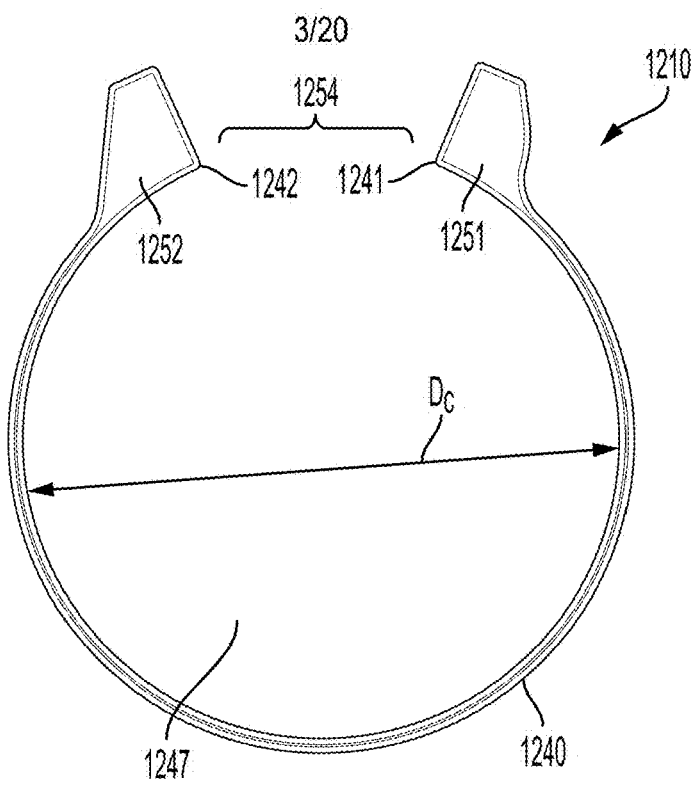
FIG. 3A is an end view of a clamp of the pipe fitting of FIG. 1.
Figure 3B:
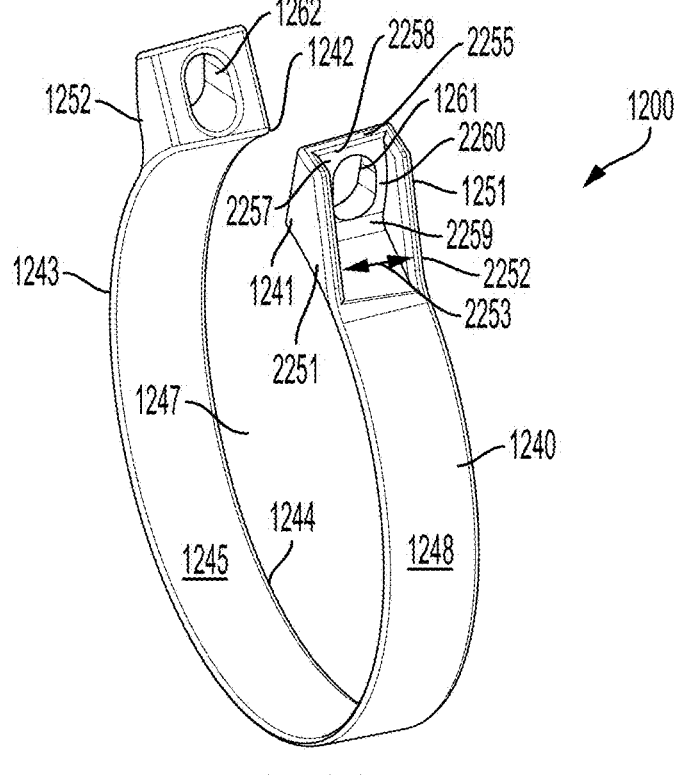
FIG. 3B is a perspective view of the clamp of FIG. 3A.

FIGS. 3A and 3B illustrate an example aspect of the fitting clamp 1210. The fitting clamp 1210 can comprise the substantially C-shaped clamp body 1240 defining the first circumferential clamp end 1241 and the second circumferential clamp end 1242. The clamp gap 1254 can be defined between the first circumferential clamp end 1241 and the second circumferential clamp end 1242. The clamp body 1240 can further define a first axial clamp end 1243 and a second axial clamp end 1244 opposite the first axial clamp end 1243. The inner clamp surface 1245 of the clamp body 1240 can extend between the first axial clamp end 1243 and the second axial clamp end 1244, and the clamp void 1247 can be defined by the inner clamp surface 1245.

The clamp body 1240 can further define an outer clamp surface 1248 opposite the inner clamp surface 1245. The first fastener catch 1251 can extend radially outwardly from the outer clamp surface 1248 of the clamp body 1240 proximate the first circumferential clamp end 1241, and the second fastener catch 1252 can extend radially outwardly from the outer clamp surface 1248 of the clamp body 1240 at the second circumferential clamp end 1242. The first fastener catch 1251 can define the first bolt hole 1261, and the second fastener catch 1252 can define the second bolt hole 1262. The first bolt hole 1261 and the second bolt hole 1262 can be configured to receive the bolt shaft 214 (seen with reference to FIG. 1) of the tightening fastener 200 (seen with reference to FIG. 1) therethrough.

With returning reference to FIG. 1, in assembly with the fitting body 1000, the first fastener catch 1251 can extend radially outwardly through the assembly window 1101 and the second fastener catch 1252 can extend radially outwardly through the assembly window 1101. In various aspects, the tightening fastener 200 can be arranged radially outside of the fitting body 1000.

Figures 4A, 4B, 4C:
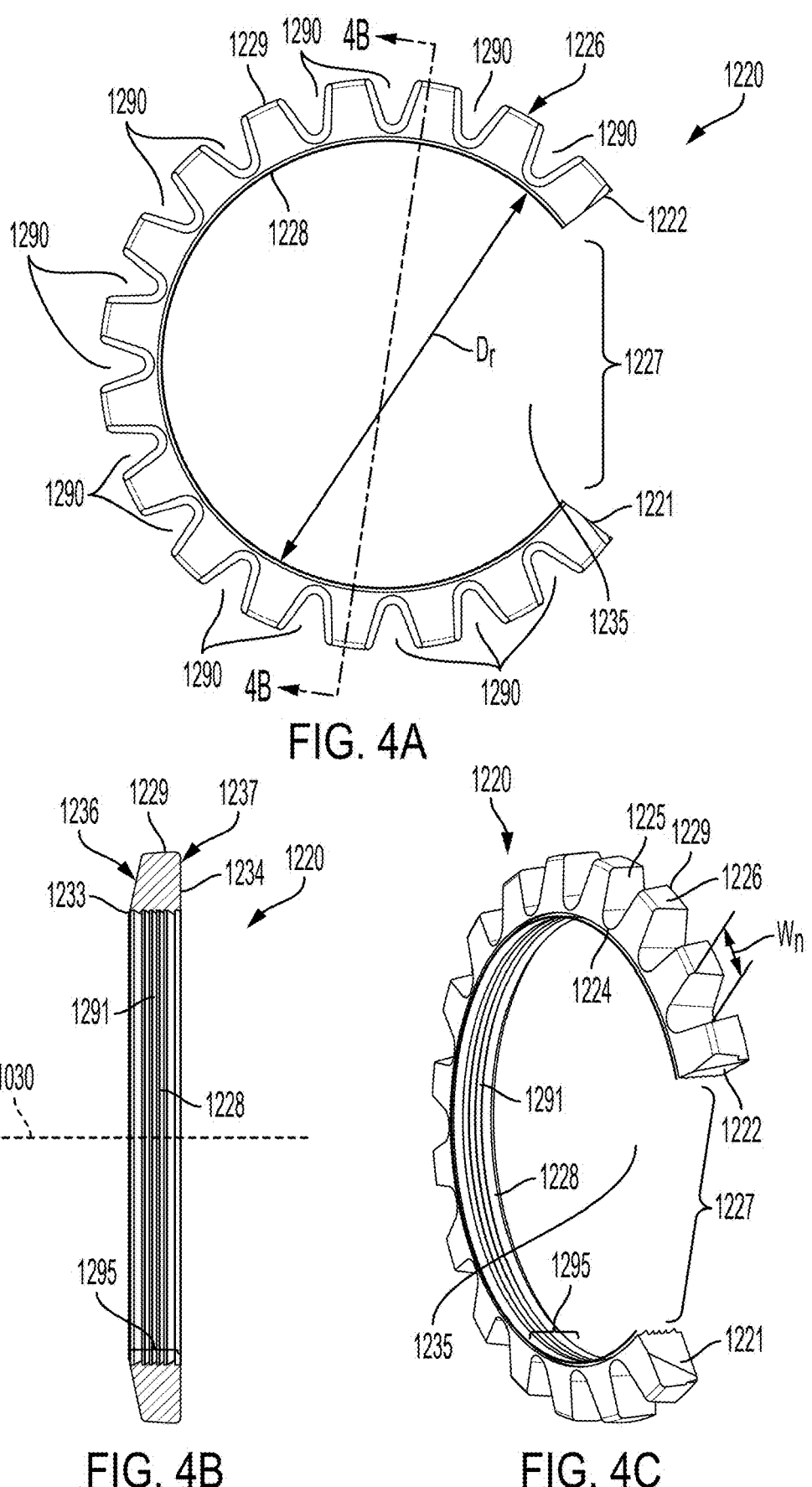
FIG. 4A is an end view of a grip ring of the pipe fitting of FIG. 1.
FIG. 4B is a cross-sectional view of the grip ring of FIG. 4A, taken along line the section defined by 4B-4B in FIG. 4A.
FIG. 4C is a perspective view of the grip ring of FIG. 4A.

FIGS. 4A-4C illustrate an example aspect of the flexible metal grip ring 1220. The grip ring 1220 can be substantially C-shaped and can define the first circumferential ring end 1221 and the second circumferential ring end 1222. The ring gap 1227 can be defined between the first circumferential ring end 1221 and the second circumferential ring end 1222. The grip ring 1220 can define a first axial ring end 1233 and a second axial ring end 1234 opposite the first axial ring end 1233. A first ring side surface 1236 can be formed at the first axial ring end 1233 and a second ring side surface 1237 can be formed at the second axial ring end 1234. The first ring side surface 1236 can be sloped or angled relative to the fitting axis 1030, as seen with reference to FIG. 4B, and can be configured to confront and/or to engage the first retention shoulder 1041 (seen with reference to FIG. 1) of the fitting body 1000 (seen with reference to FIG. 1) and/or the radial bridge shoulder (seen with reference to FIGS. 8A and 8B) of the gasket bridge 1260 (seen with reference to FIGS. 8A and 8B). The second ring side surface 1237 can be substantially perpendicular to the fitting axis.

The grip ring 1220 can further define the radially inward ring end 1228 and the radially outward ring end 1229, relative to the fitting axis 1030. The inner ring surface 1291 can be formed at the radially inward ring end 1228 and the outer ring surface 1226 can be formed at the radially outward ring end 1229. The grip ring 1220 can define the plurality of ring relief notches 1290 extending into the outer ring surface 1226. Moreover, the ring relief notches 1290 can be positioned at the first axial ring end 1233 and can further extend into the first ring side surface 1236. Each of the ring relief notches 1233 can define a radially outward notch end defined at the outer ring surface and a radially inward notch end 1224 opposite the radially outward notch end 1225 (illustrated once in FIG. 4C). In some aspects, a notch width $W_n$ of each ring relief notch 1290 can taper from the radially outward notch end 1225 to the radially inward notch end 1224. In some aspects, each of the ring relief notches 1290 can be curved at the radially inward notch end 1224. The ring relief notches 1290 can be evenly spaced about the circumference of the grip ring 1220. As previously described, the flexible metal material of the grip ring 1220 and the ring relief notches 1290 can allow the grip ring 1220 to flex during tightening of the pipe fitting 500 (seen with reference to FIG. 1) to reduce the inner ring diameter $D_r$.

The inner ring surface 1291 can define a ring void 1235 extending centrally through the grip ring 1220. As seen with reference to FIGS. 4B and 4C, the inner ring surface 1291 can define the plurality of circumferential gripping ridges 1295 extending from the first circumferential ring end 1221 to the second circumferential ring end 1222. In other aspects, each of the gripping ridges 1295 can be formed as a plurality of ridge segments spaced circumferentially between the first circumferential ring end 1221 and the second circumferential ring end 1222. Each of the gripping ridges 1295 can define a substantially triangular cross-sectional shape in the present aspect. In other aspects, the gripping ridges 1295 can define any other suitable cross-sectional shape. In the current aspect, the gripping ridges 1295 can be biased toward the second axial ring end 1234 such that the gripping ridges 1295 can point more towards the second axial ring end 1234 than toward the first axial ring end 1233. Additionally, in the current aspect, the one of the gripping ridges 1295 located closest to the first axial ring end 1233 and the one of the gripping ridges 1295 located closest to the second axial ring end 1234 can each be larger and can extend radially inwardly further than the gripping ridges 1295 therebetween. Such a grip ring 1220 is described in further detail in U.S. application Ser. No. 18/922,536, filed Oct. 22, 2024, which is hereby specifically incorporated by reference herein in its entirety.

Figure 5C:
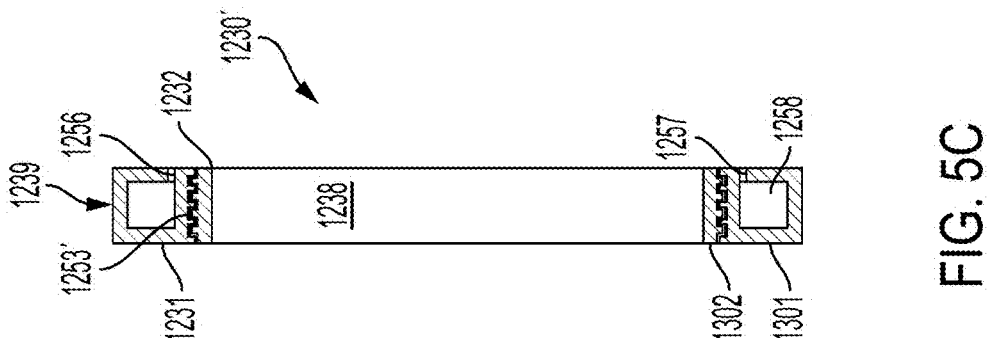
FIG. 5C is a cross-section view of another aspect of a gasket taken along the section defined by line 5B-5B in FIG. 5A.
Figure 5B:
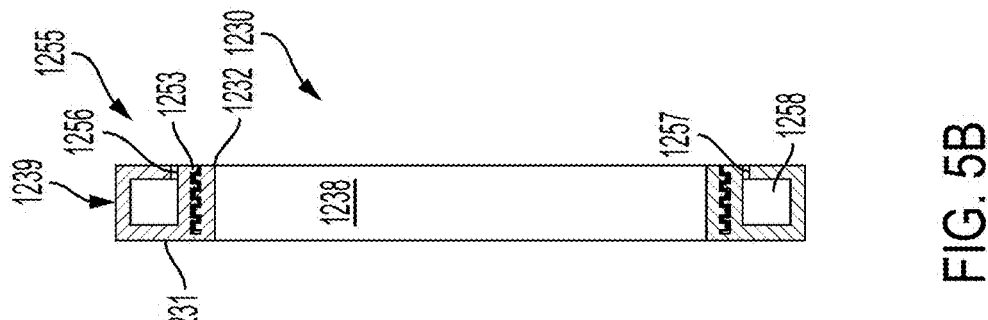
FIG. 5B is a cross-sectional view of the gasket of FIG. 5A, taken along the section defined by line 5B-5B in FIG. 5A.
Figure 5A:
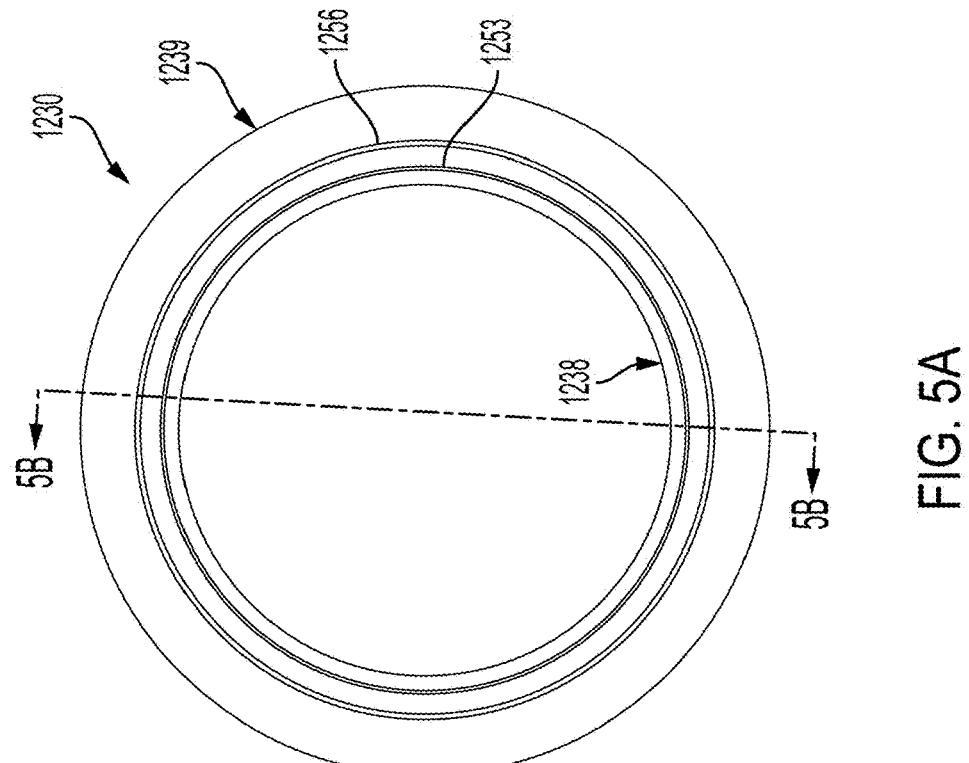
FIG. 5A is an end view of a gasket of the pipe fitting of FIG. 1.

FIGS. 5A and 5B illustrate an example aspect of the fitting gasket 1230. The fitting gasket 1230 can be substantially annular and can define the outer gasket surface 1239 and the inner gasket surface 1238 (i.e., the gasket sealing surface). In the present aspect, both the outer gasket surface 1239 and the inner gasket surface 1238 can be substantially smooth. In various aspects, various surfaces can comprise textures as would be known in the art. The fitting gasket 1230 can further define a first axial gasket end 1231 and a second axial gasket end 1232. In some aspects, one or more gasket channels 1255 can extend axially into the second axial gasket end 1232. In the present aspect, an inner gasket channel 1253 can extend axially into the second axial gasket end 1232 proximate to the inner gasket surface 1238 and an outer gasket channel 1256 can extend axially into the second axial gasket end 1232 proximate to the outer gasket surface 1239. The inner gasket channel 1253 can define alternating radially inward and radially outward turns to create a variable, non-linear pathway. The outer gasket channel 1256 can define a narrow channel portion 1257 extending into the second axial gasket end 1232 that can open into a wider channel portion 1258.

In various aspects, a modified fitting gasket 1230' as seen with reference to FIG. 5C can be utilized in place of the fitting gasket 1230. In such aspects, the inner gasket channel 1253 can be replaced by a gasket interface 1253'. The gasket interface 1253' can extend entirely from the second axial gasket end 1232 to the first axial gasket end 1231, thereby separating the fitting gasket 1230 into an gasket portion 1301 and an inner gasket portion 1302. The inner gasket portion 1302 can be a tear-away portion. The inner gasket portion 1302 in various aspects can be removable in assembly to accommodate varying sizing of piping components 50. For example, when the piping components 50 have a relatively small diameter, the inner gasket portion 1302 can be included in the assembly to accommodate sealing. When the piping components 50 have a relatively large diameter, the inner gasket portion 1302 can be removed—or, in other words, "torn away"—to accommodate sealing without interference with the piping components 50. As such, the fitting gasket 1230' can accommodate a wide range of piping diameters without substantially modifying physical attributes of the pipe fitting 500.

Figure 6A:
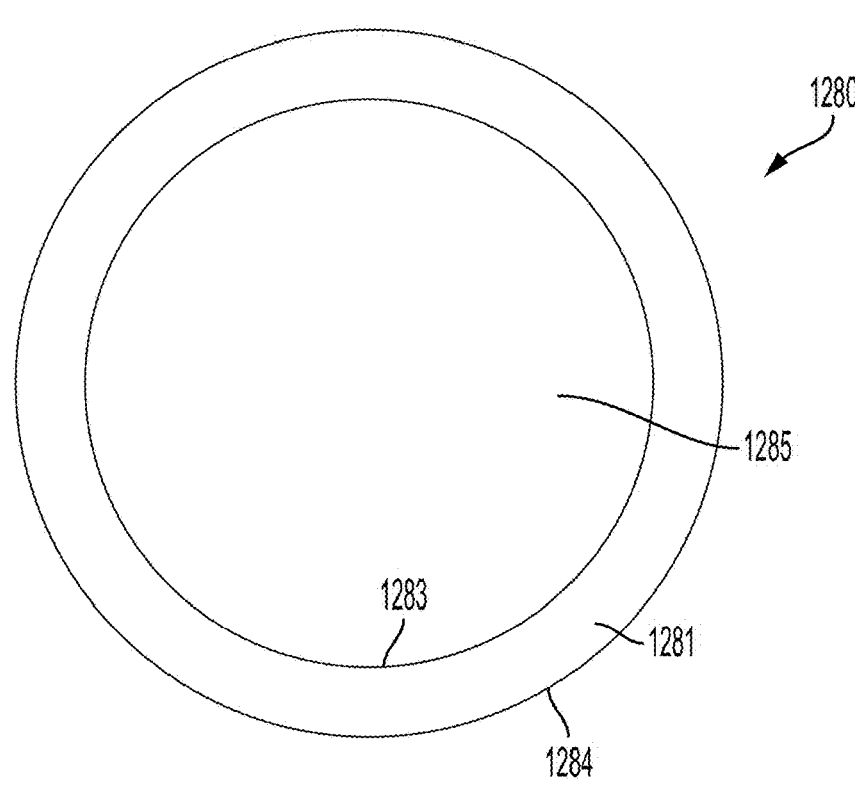
FIG. 6A is an end view of a washer of the pipe fitting of FIG. 1.
Figure 6B:
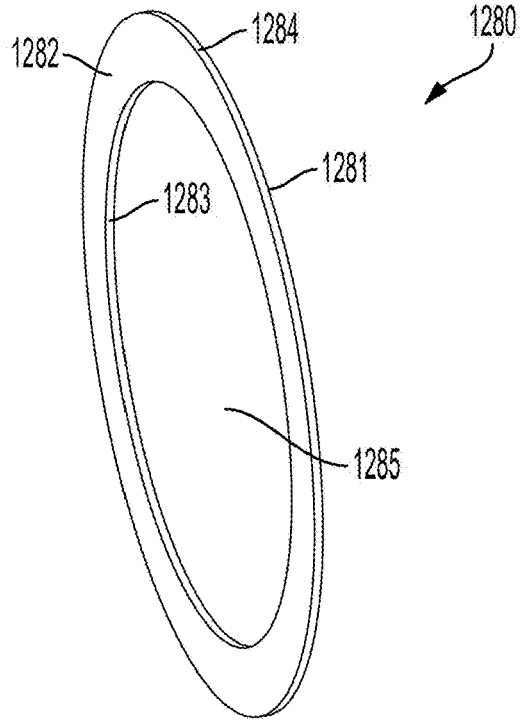
FIG. 6B is a perspective view of the washer of FIG. 6A.

FIGS. 6A and 6B illustrate an example aspect of the clamp washer 1280. Example aspects of the clamp washer 1280 can comprise a metal material. In other aspects, the clamp washer 1280 can comprise any other suitable material. The clamp washer 1280 can be a standard, annular flat washer in various aspects. The clamp washer 1280 can define a first flat face 1281, a second flat face 1282 opposite the first flat face 1281, a radially inner edge 1283, and a radially outer edge 1284. Each of the radially inner edge 1283 and the radially outer edge 1284 can be substantially circular in the present aspect. The radially inner edge 1283 can define a washer void 1285 extending through the clamp washer 1280.

Figure 7:
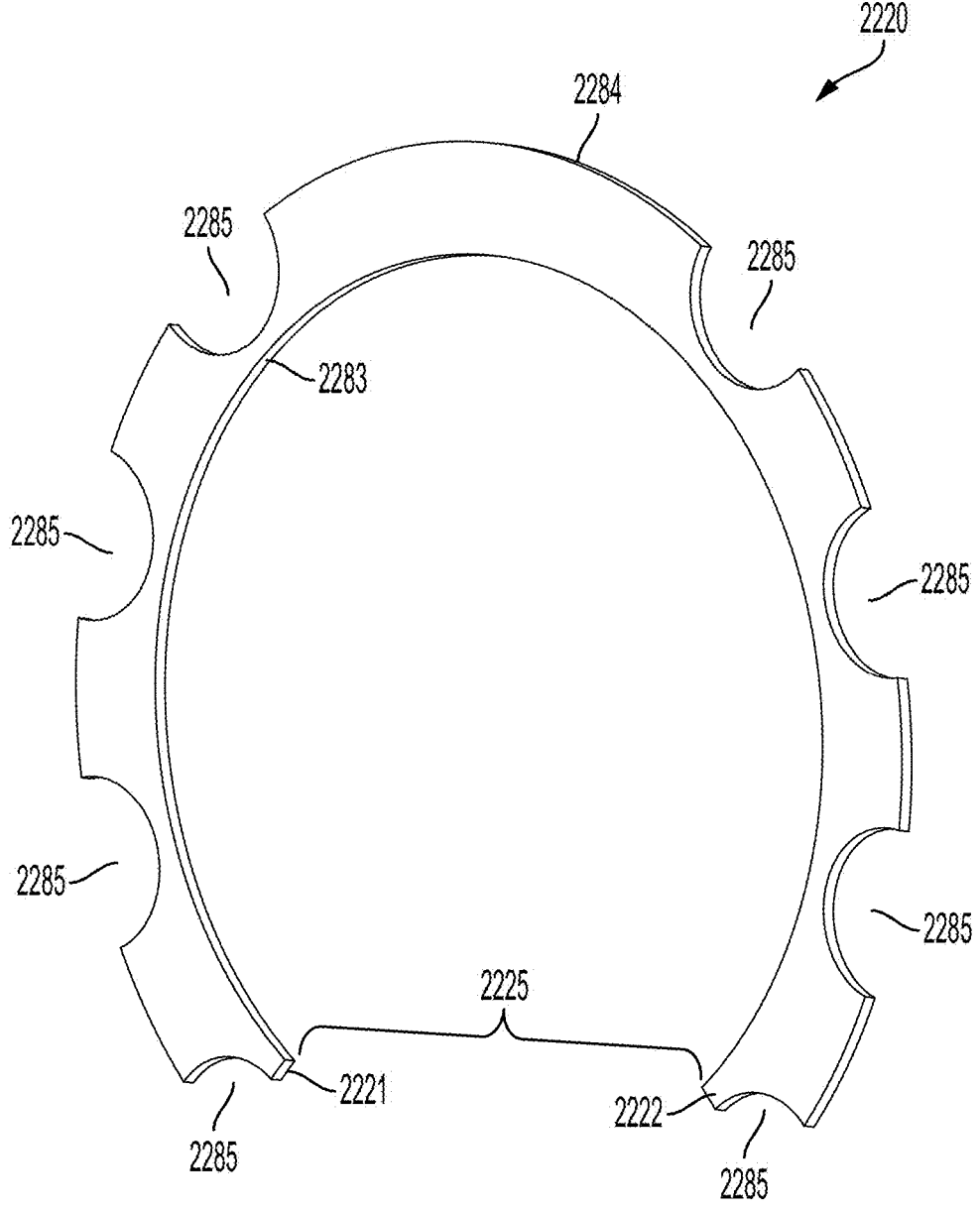
FIG. 7 is a perspective view of a washer in accordance with one aspect of the present disclosure.

FIG. 7 illustrates another example aspect of a clamp washer 2220. In the present aspect, the clamp washer 2220 can be C-shaped instead of annular. The C-shaped clamp washer 2220 can comprise a flexible metal material. In other aspects, the C-shaped clamp washer 2220 can comprise any other suitable material. The C-shaped clamp washer 2220 can define a first circumferential washer end 2221 and a second circumferential washer end 2222. A washer gap 2225 can be defined between the first circumferential washer end 2221 and the second circumferential washer end 2222. Each of a radially inner edge 2283 and the radially outer edge 2284 can be substantially C-shaped, as shown.

Moreover, a plurality of washer relief notches 2285 can be spaced circumferentially about the C-shaped clamp washer 2220 and can extend into the radially outer edge 2284 thereof. Each of the washer relief notches 2285 can be defined by a curved profile in the present aspect. More specifically, each of the washer relief notches can be substantially semi-circular in the present aspect. The washer gap 2225 formed between the first circumferential washer end 2221 and the second circumferential washer end 2222 along with the washer relief notches 2285 and the flexible metal material of the C-shaped clamp washer can allow the C-shaped clamp washer 2220 to flex as needed when tightening the pipe fitting 500 (seen with reference to FIG. 1).

FIGS. 8A and 8B illustrate an example aspect of the gasket bridge 1260. The gasket bridge 1260 can be substantially arcuate, as shown, and can define a first circumferential bridge end 1271 and a second circumferential bridge end 1272 opposite the first circumferential bridge end 1271. The gasket bridge 1260 can further define the first axial bridge end 1266 and the second axial bridge end 1267. The arcuate axial bridge wall 1268 can extend from the first axial bridge end 1266 to the second axial bridge end 1267. The arcuate radial bridge shoulder 1269 can extend substantially radially inwardly from the axial bridge wall 1268 at the first axial bridge end 1266. As seen in FIG. 8B, in some aspects, the radial bridge shoulder 1269 can be sloped or angled such as to match substantially the slope or angle of the first ring side surface 1236 (seen with reference to FIG. 4B) of the grip ring 1220 (seen with reference to FIG. 2).

Figures 9A, 9B:
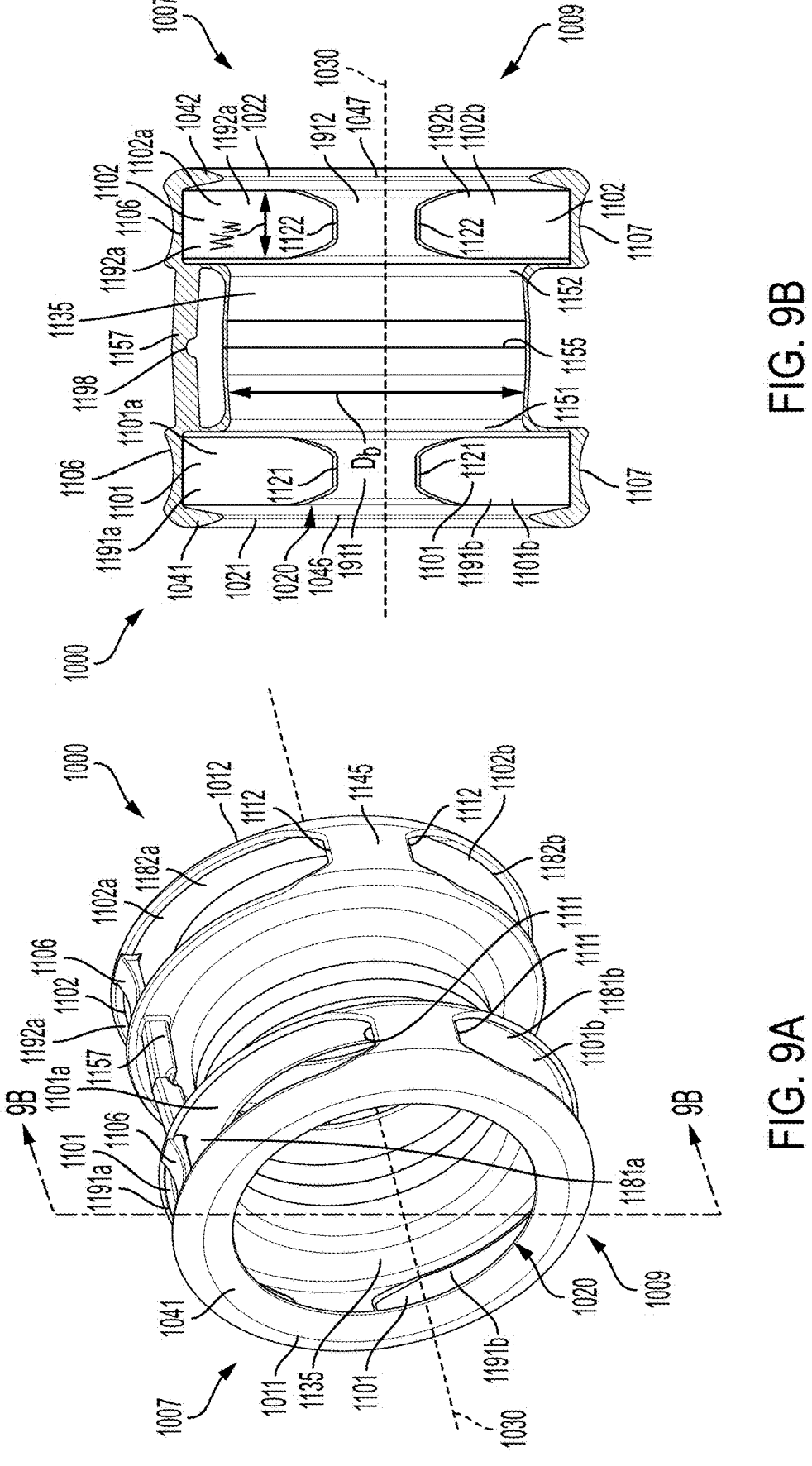
FIG. 9A is a perspective view of a fitting body of the pipe fitting of FIG. 1.
FIG. 9B is a cross-sectional view of the fitting body of FIG. 9A, taken along line 9B-9B in FIG. 9A.

FIGS. 9A and 9B illustrate an example aspect of the fitting body 1000. The fitting body 1000 can be substantially tubular and can define the inner body surface 1135 and the outer body surface 1145. The first axial fitting end 1011 of the fitting body 1000 can be disposed opposite the second axial fitting end 1012 thereof. The inner body surface 1135 can define the fitting bore 1020 extending from the first axial fitting end 1011 to the second axial fitting end 1012. The fitting bore 1020 can define the first bore opening 1021 at the first axial fitting end 1011 and the second bore opening 1022 at the second axial fitting end 1012. The fitting axis 1030 can extend centrally through the fitting bore 1020.

The fitting body 1000 can define the first retention shoulder 1041 extending radially inwardly at the first axial fitting end 1011 and the second retention shoulder 1042 extending radially inwardly at the second axial fitting end 1012. Each of the first retention shoulder 1041 and the second retention shoulder 1042 can define a corresponding axially inward shoulder surface 1046,1047, respectively. Each of the first retention shoulder 1041 and the second retention shoulder 1042 can be convex in various aspects. In various aspects, such convex shape can assist in improving strength of the first retention shoulder 1041 and the second retention shoulder 1042. Each of the axially inward shoulder surfaces 1046,1047 can be sloped or angled to match substantially the slope or angle of the first ring side surface 1236 (seen with reference to FIG. 4B) of the grip ring (seen with reference to FIG. 2) and/or to match substantially the slope or angle of the radial bridge shoulder 1269 (seen with reference to FIG. 2) of the gasket bridge 1260 (seen with reference to FIG. 2).

According to example aspects, the inner body surface 1135 of the fitting body 1000 can define a first radial inner shoulder 1151 spaced axially inwardly from the first retention shoulder 1041. The first clamp groove 1911 can be defined axially between the first retention shoulder 1041 and the first radial inner shoulder 1151. Similarly, the inner body surface 1135 of the fitting body 1000 can define a second radial inner shoulder 1152 spaced axially inward from the second retention shoulder 1042. A second clamp groove 1912 can be defined axially between the second retention shoulder 1042 and the second radial inner shoulder 1152. The first one of the clamp assemblies 1200 can be configured to nest within the first clamp groove 1911, and the second one of the clamp assemblies 1200 (if present) can be configured to nest within the second clamp groove 1912.

An intermediate body portion 1155 of the fitting body 1000 can extend between the first clamp groove 1911 and the second clamp groove 1912. In example aspects, an inner body diameter $D_b$ of the fitting body 1000 can be decreased at the intermediate body portion 1155 as compared to the inner body diameter $D_b$ at each of the first clamp groove 1911 and the second clamp groove 1912.

The fitting body 1000 can further define the assembly windows 1101, 1102. The assembly windows 1101, 1102 can include the first upper assembly window 1101$a$ formed at the upper portion 1007 of the fitting body 1000 proximate to the first axial fitting end 1021 and the first lower assembly window 1101$b$ formed at the lower portion 1009 of the fitting body 1000 proximate to the first axial fitting end 1021. The location of the first upper assembly window 1101$a$ and the first lower assembly window 1101$b$ can correspond to the location of the first clamp groove 1911, as shown. Other aspects may comprise only one of the first upper assembly window 1101$a$ or the first lower assembly window 1101$b$.

The assembly windows 1101,1102 can further include the second upper assembly window 1102$a$ formed at the upper portion 1007 of the fitting body 1000 proximate to the second axial fitting end 1022 and the second lower assembly window 1102$b$ formed at the lower portion 1009 of the fitting body 1000 proximate to the second axial fitting end. The location of the second upper assembly window 1102$a$ and the second lower assembly window 1102$b$ can correspond to the location of the second clamp groove 1912, as shown. Other aspects can comprise only one of the second upper assembly window 1102$a$ or the second lower assembly window 1102$b$.

Each of the assembly windows 1101,1102 can be elongated and can extend partially about the circumference of the fitting body 1000. Each of the assembly windows 1101 can define a first circumferential window end 1111 and a second circumferential window end 1121 opposite the first circumferential window end 1111. Each of the assembly windows 1102 can define a first circumferential window end 1112 and a second circumferential window end 1122 opposite the first circumferential window end 1112. As best seen in FIG. 9B, in some aspects, a window width $W_w$ of each of the assembly windows 1101,1102 can taper adjacent to the first circumferential window end 1111,1121 and the second circumferential window end 1121,1122.

Example aspects of the fitting body 1000 can further comprise the upper reinforcing ribs 1106 and the lower reinforcing ribs 1107. In the present aspect, each of the upper reinforcing ribs 1106 can axially traverse a corresponding one of the first upper assembly window 1101$a$ and the second upper assembly window 1102$a$, about midway between the first circumferential window end 1111,1112 and the second circumferential window end 1121, 1122, respectively, to reinforce the fitting body 1000 at the location of the first upper assembly window 1101$a$ and the second upper assembly window 1102$a$. Each of the first and second upper assembly windows 1101$a$, 1102$a$ can thereby be sectioned by the reinforcing rib into the first window section 1181$a$, 1182$a$ and the second window section 1191$a$, 1192$a$. In some aspects, the fitting body 1000 can also define an intermediate reinforcing rib 1157 extending axially along the intermediate body portion 1155 of the fitting body 1000 at the upper portion 1007 thereof, between the first upper assembly window 1101$a$ and the second upper assembly window 1102$a$. The intermediate reinforcing rib 1157 may be substantially aligned with each of the upper reinforcing ribs 1106 in some aspects.

In various aspects, the intermediate reinforcing rib 1157 can define a scallop 1198. In various aspects, the scallop 1198 can serve as a detent or a catch. In various aspects, the fitting body 1000 can be of substantial weight such that the easiest method of lifting the pipe fitting 500 can be by use a lifting machine such as a crane, a backhoe, or a jack. In various aspects, a chain or a hook can be attached to the lifting machine and arranged in alignment with the scallop 1198. When the fitting body 1000 is lifted by the lifting machine, such chain or hook can be arranged within the scallop 1198 to keep the fitting body 1000 balanced below a center of the lifting point. The fitting body 1000 can be roughly balanced such that the fitting axis 1030 can remain about horizontal. As such, the pipe fitting 500 can be more easily arranged in alignment with pipe segments 100 even when the fitting body 1000 can be of substantial weight.

The fitting body 1000 can further define the lower reinforcing ribs 1107. Each of the lower reinforcing ribs 1107 can axially traverse a corresponding one of the first lower assembly window 1101$b$ and the second lower assembly window 1102$b$, about midway between the first circumferential window end 1111, 1112 and the second circumferential window end 1121, 1122 to reinforce the fitting body 1000 at the location of the first and second lower assembly windows 1101$b$, 1102$b$, respectively. Each of the first lower assembly window 1101$b$ and the second lower assembly window 1102$b$ can thereby be sectioned by the reinforcing rib 1107 into the first window section 1181$b$, 1182$b$ and the second window section 1191$b$, 1192$b$, respectively.

In various aspects, each of the upper reinforcing ribs 1106 and the lower reinforcing ribs 1107 can comprise a concave shape. In various aspects, the upper reinforcing ribs 1106 and the lower reinforcing ribs 1107 can comprise a concave outer surface shape. In various aspects, the concave shape can provide physical clearance for the fastener bolt 210 in assemblies such as those wherein the fastener bolt 210 can overlap or span at least one of the upper reinforcing ribs 1106 and the lower reinforcing ribs 1107.

Figure 10:
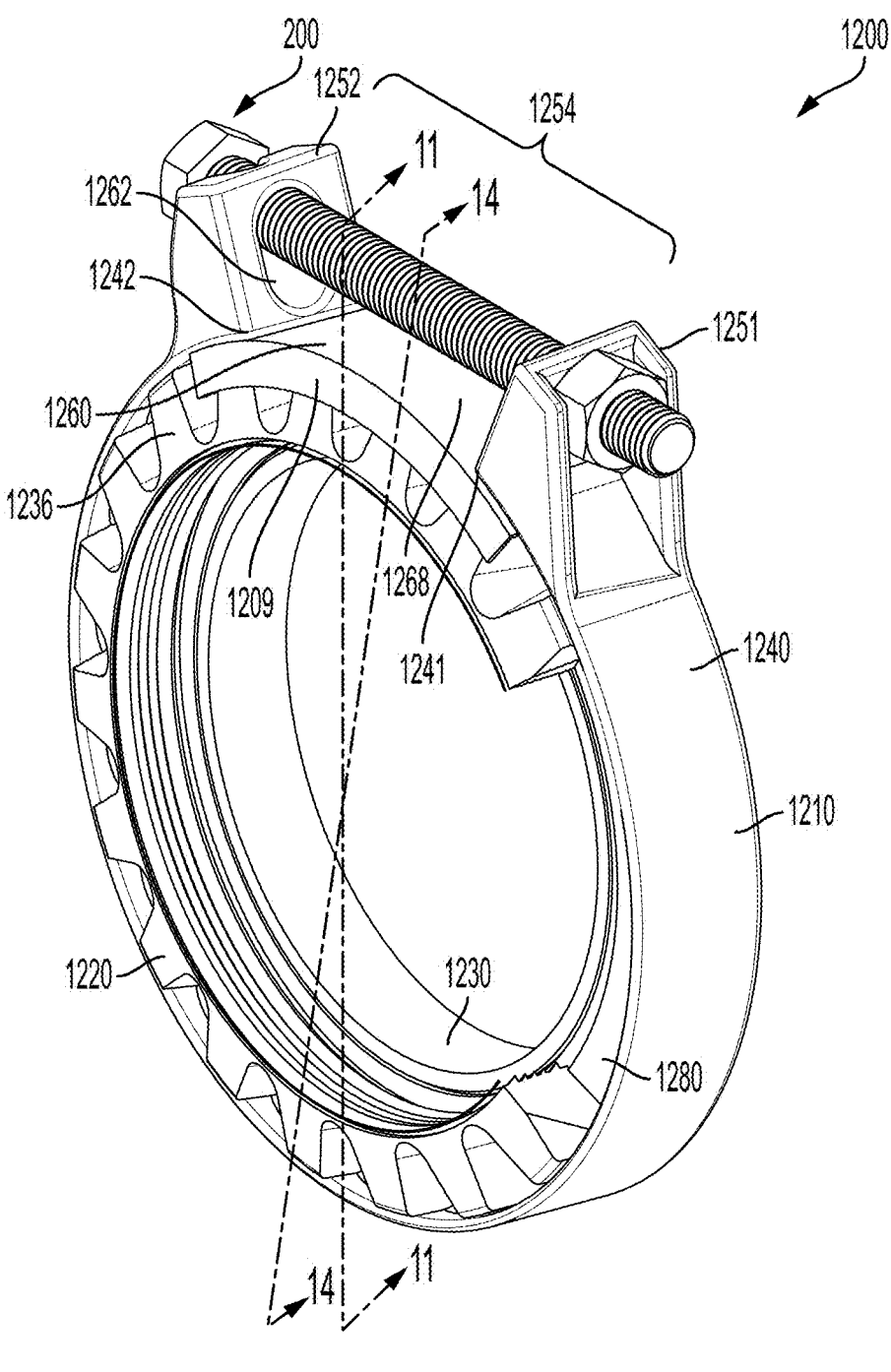
FIG. 10 is a perspective view of a clamp assembly of the pipe fitting of FIG. 1 in an untightened configuration.
Figure 11:
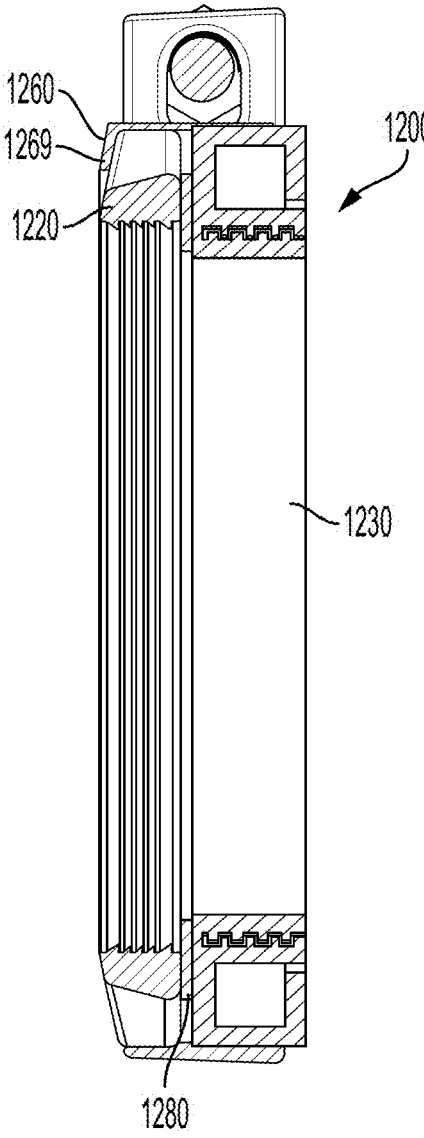
FIG. 11 is a cross-sectional view of the clamp assembly of FIG. 10 in the untightened configuration, taken along the section defined by line 11-11 in FIG. 10.
Figure 12:
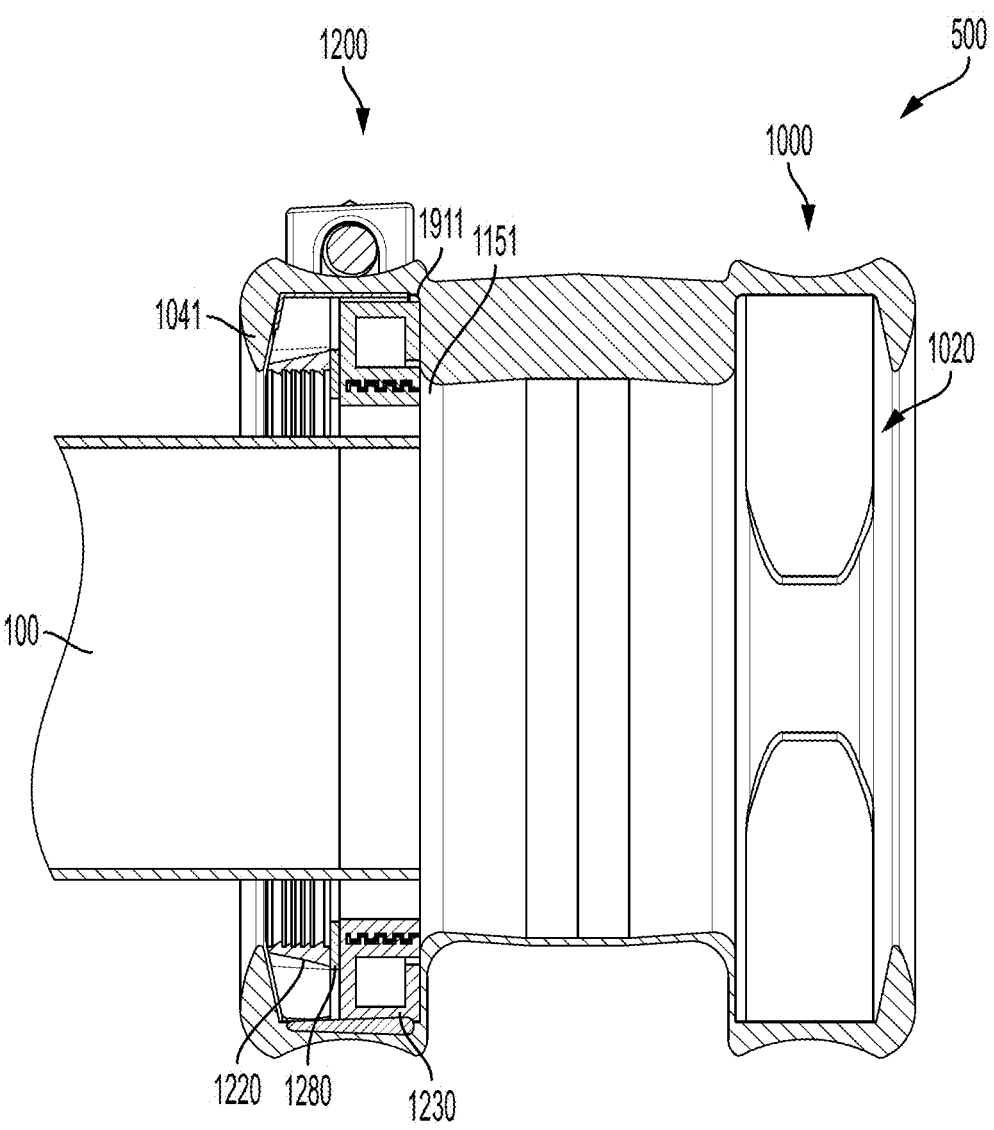
FIG. 12 is a cross-sectional view of the pipe segment assembled with the pipe fitting of FIG. 1 in the untightened configuration, taken along the section defined by line 12-12 in FIG. 1.

FIGS. 10-12 illustrate the clamp assembly 1200 in the untightened configuration. Referring to FIGS. 10 and 11, the clamp assembly 1200 can comprise the fitting clamp 1210, the grip ring 1220, the clamp washer 1280, the fitting gasket 1230, and the gasket bridge 1260. The C-shaped clamp body 1240 of the clamp assembly 1200 can partially surround the grip ring 1220, the clamp washer 1280, and the fitting gasket 1230. The clamp washer 1280 can be disposed axially between the grip ring 1220 and the fitting gasket 1230. In the present aspect, the clamp washer 1280 can be the annular flat clamp washer 1280 seen with reference to FIGS. 6A and 6B. In various aspects, various washers such as clamp washer 2220 can be utilized.

The arcuate axial bridge wall 1268 of the gasket bridge 1260 can be arranged radially outwardly of the fitting gasket 1230 and can span the clamp gap 1254 defined between the first circumferential clamp end 1241 and the second circumferential clamp end 1242. The arcuate radial gasket shoulder 1269 can extend radially inwardly along a portion of the first ring side surface 1236 of the grip ring 1220. The first fastener catch 1251 and the second fastener catch 1252 can extend radially outwardly from the clamp body 1240 at the first circumferential clamp end 1241 and the second circumferential clamp end 1242, respectively. The tightening fastener 200 can comprise the fastener bolt 210 and the fastener nut 220. The bolt shaft 214 of the fastener bolt 210 can extend through the first bolt hole 1261 (seen with reference to FIG. 2) of the first fastener catch 1251 and the second bolt hole 1262 of the second fastener catch 1252.

Referring to FIG. 12, the clamp assembly 1200 can be arranged substantially within fitting bore 1020 of the of the fitting body 1000. More specifically, the clamp assembly 1200 can be arranged substantially within the first clamp groove 1911 between the first retention shoulder 1041 and the first radial inner shoulder 1151. The first and second fastener catches 1251,1252 can extend radially outwardly through the first upper assembly window 1101a (seen with reference to FIG. 1). The first fastener catch 1251 can extend through the first window section 1181a of the first upper window assembly 1101a, and the second fastener catch 1252 can extend through the second window section 1191a of the first upper window assembly 1101a. The tightening fastener 200 can engage the first fastener catch 1251 and the second fastener catch 1252 external to the fitting body 1000, allowing easy access to the tightening fastener 200. The pipe end 110 of the pipe segment 100 can be inserted into the fitting bore 1020 through the first bore opening 1021, and the clamp assembly 1200 can encircle the pipe end 110. In the untightened configuration, the clamp assembly 1200 can be arranged not to engage the outer pipe surface 105 of the pipe segment 110 in various aspects. In the untightened configuration, the clamp assembly 1200 can be arranged in loose engagement with the outer pipe surface 105 of the pipe segment 110 in various aspects.

Figure 13:
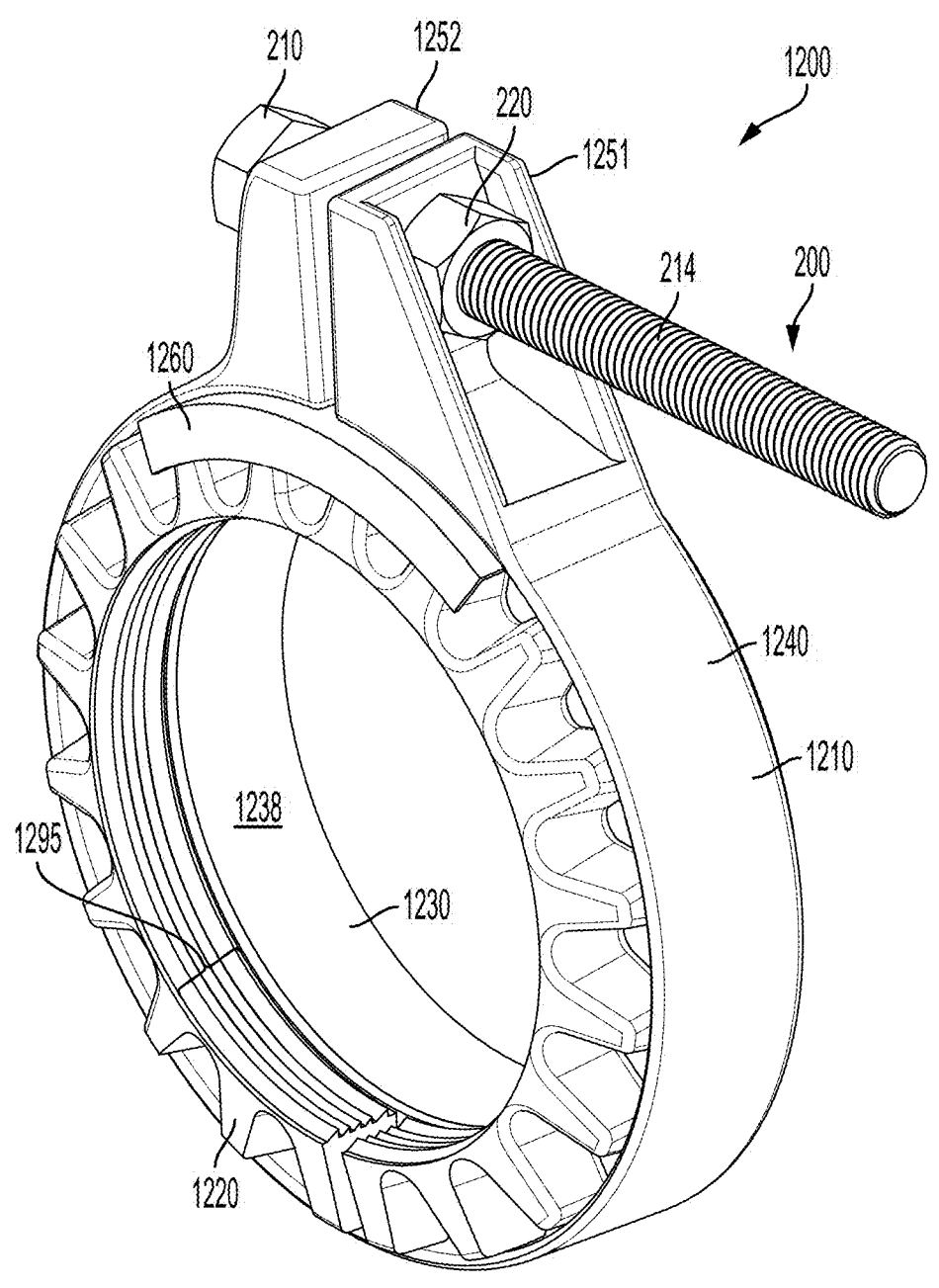
FIG. 13 is a perspective view of the clamp assembly of FIG. 10 in a tightened configuration.
Figure 14:
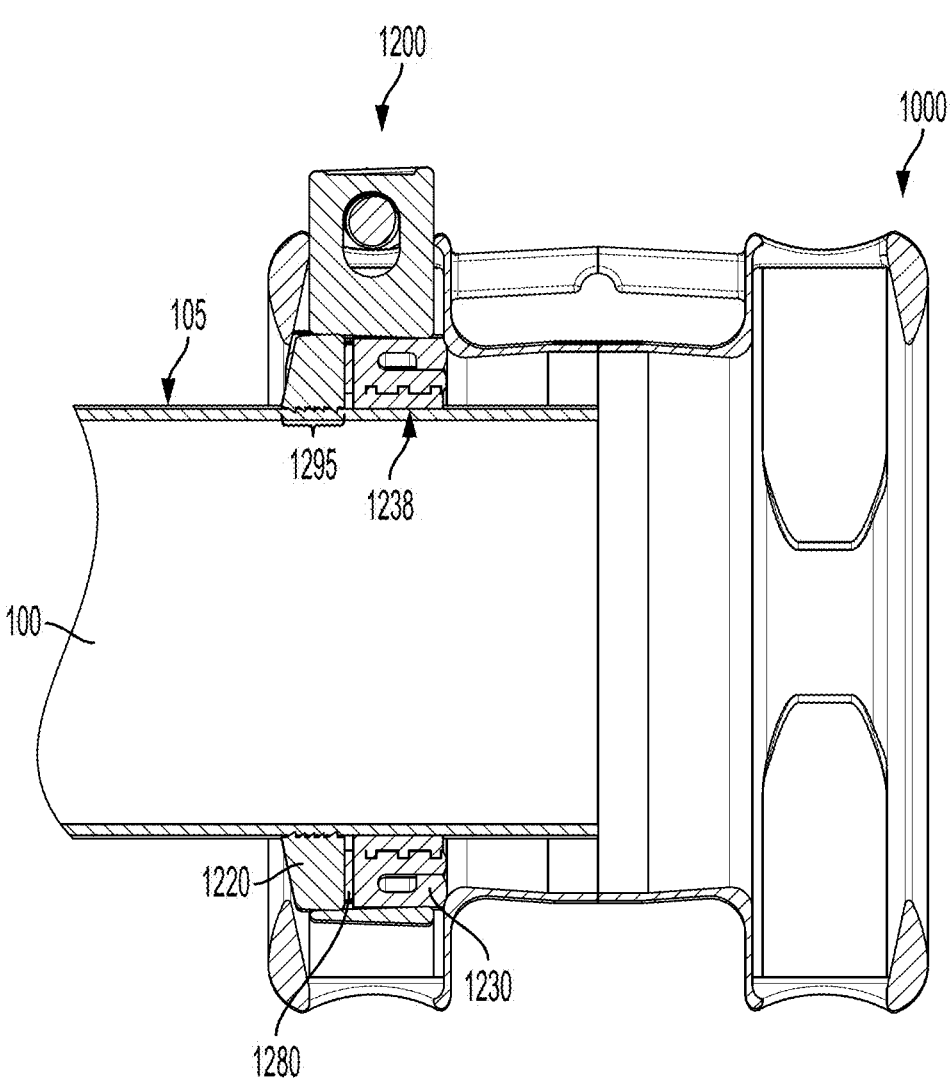
FIG. 14 is a cross-sectional view of the pipe segment assembled with the pipe fitting of FIG. 1 in the tightened configuration, taken along the section defined by line 14-14 in FIG. 1.

FIGS. 13 and 14 illustrate the clamp assembly 1200 in the tightened configuration. Referring first to FIG. 13, to configure the clamp assembly 1200 in the tightened configuration, the fastener nut 220 can be tightened on the bolt shaft 214 to advance the fastener nut 220 towards the bolt head 212. As the fastener nut 220 is tightened, the fastener nut 220 can abut and apply a force against the first fastener catch 1251. With the first fastener catch 1251 and the second fastener catch 1252 captured between the bolt head 210 and the fastener nut 220, the first and second fastener catches 1251,1252 can be biased towards one another as the fastener nut 220 can be tightened against the first fastener catch 1251 while the bolt head 212 can be tightened against the second fastener catch 1252. The flexible material of the fitting clamp 1210 can allow the clamp body 1240 to flex as the first and second fastener catches 1251, 1252 can move towards one another thereby reducing the clamp diameter $D_c$ (seen with reference to FIG. 3A) of the clamp body 1240. Along with clamp diameter $D_c$ being reduced, the clamp gap 1254 can also be reduced. The inner clamp surface 1238 can apply a radially inward force against both the fitting gasket 1230 and the grip ring 1220 (and in some instances, the clamp washer 1280) as the clamp body 1240 can flex.

Referring now to FIG. 14, the flexible material of the grip ring 1220 can allow the grip ring 1220 to flex under the radial force applied by the clamp body 1240 which can cause the first circumferential ring end 1221 to travel toward the second circumferential ring end 1222 and can reduce the ring gap 1227. As such, the gap 1227 can be relatively large in the untightened configuration and relatively small in the tightened configuration. As the grip ring 1220 can flex, the gripping ridges 1295 thereof can be pressed radially inwardly to apply a substantially circumferential gripping force against the outer pipe surface 105 of the pipe segment 100. In some aspects, the gripping ridges 1295 can even bite into the outer pipe surface 105. Moreover, the fitting gasket 1230 can compress under the radial force applied by the clamp body 1240, sealing the gasket sealing surface 1238 against the outer surface 105 of the pipe 100.

Figure 15:
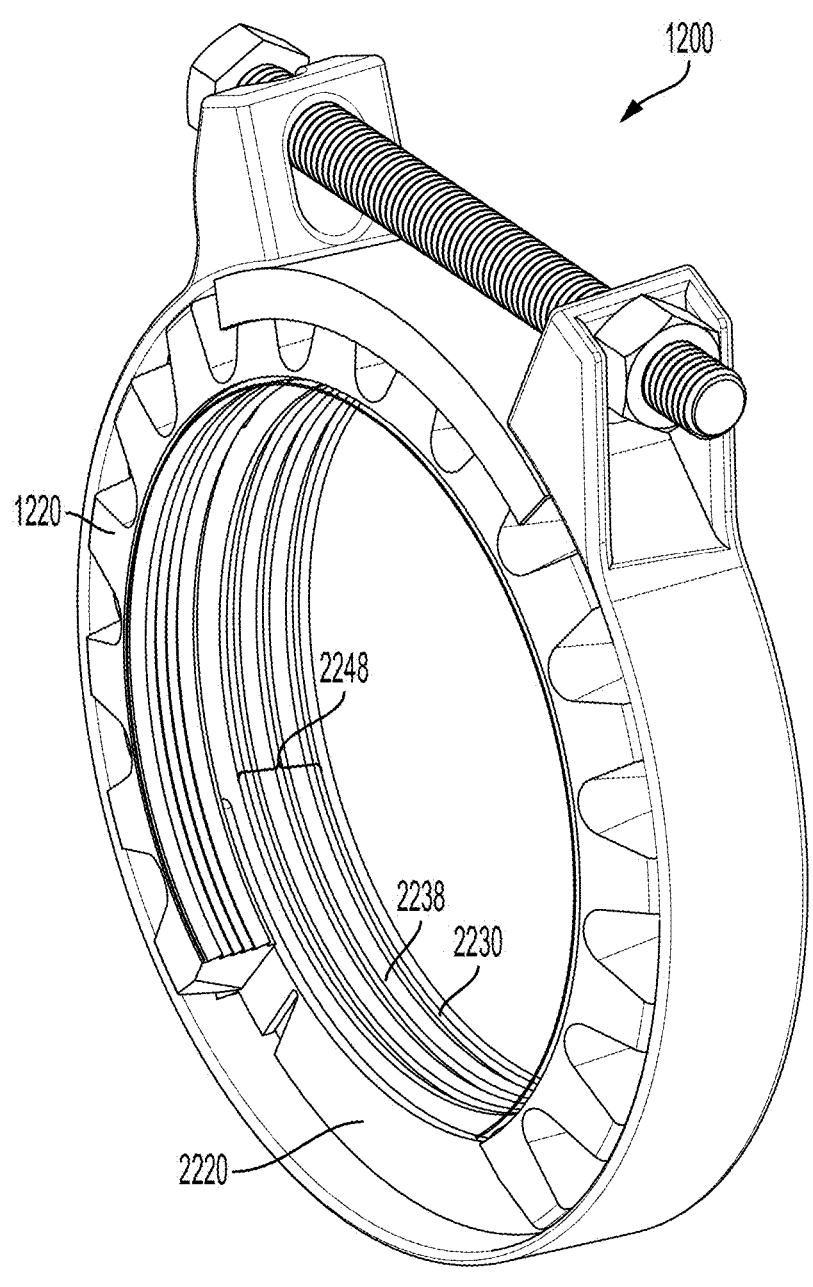
FIG. 15 is a perspective view of the clamp assembly comprising the washer of FIG. 7 in accordance with one aspect of the present disclosure, wherein the clamp assembly is in the untightened configuration.
Figure 16:
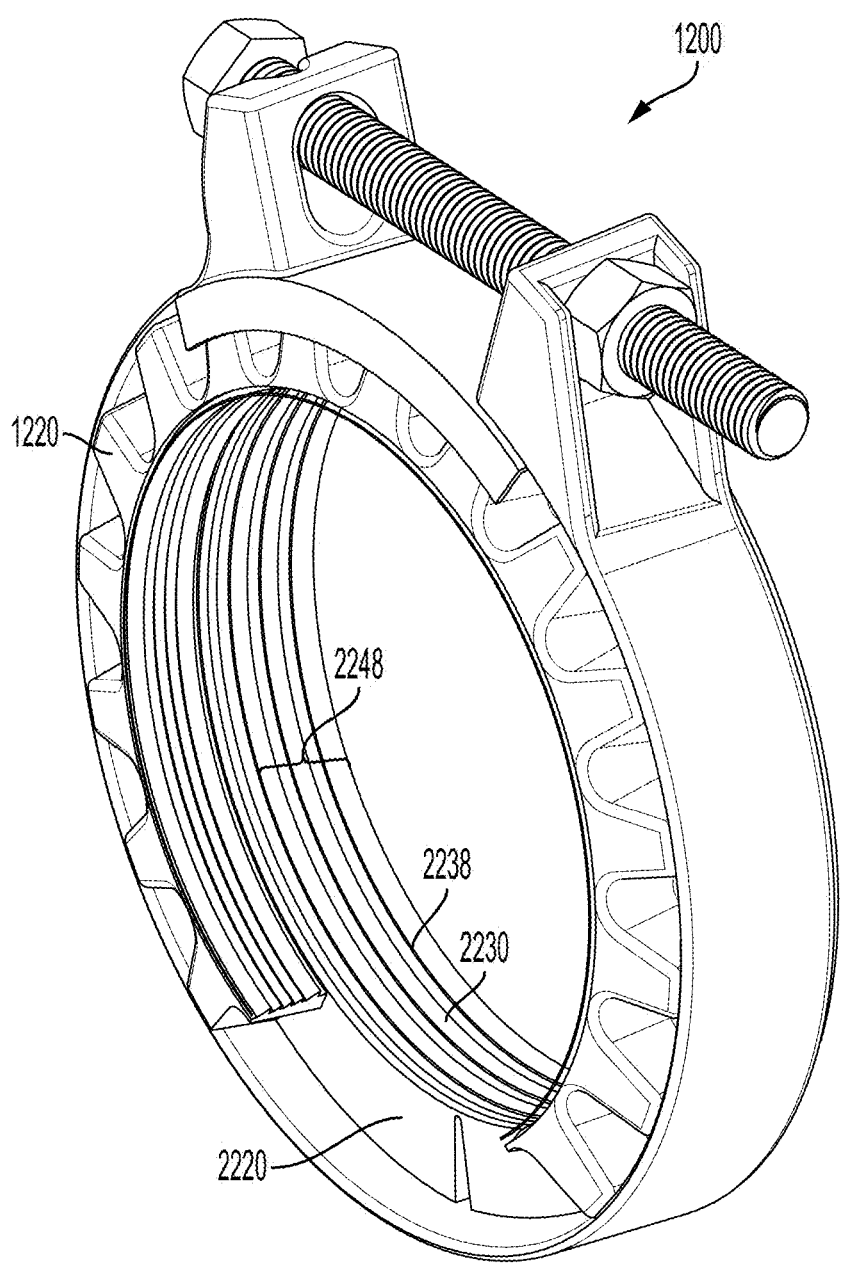
FIG. 16 is a perspective view of the clamp assembly of FIG. 15 in the tightened configuration.

FIGS. 15 and 16 illustrate the clamp assembly 1200 in the tightened and untightened configurations, respectively, in accordance with another example aspect of the present disclosure. The clamp assembly 1200 can be similar to the clamp assembly previously described and can be tightened in substantially the same manner. However, in the present aspect, the clamp washer 2220 can be utilized as seen with reference to FIG. 7. The clamp washer 220 can comprise one or more washer relief notches 2285 extending into the radially outer edge thereof. The washer relief notches 2285 can allow the clamp washer to flex as the clamp assembly is tightened.

Additionally, in the present aspect, a fitting gasket 2230 can define a gasket sealing surface 2238 that can comprise one or more annular flanges 2248 extending circumferentially thereabout. In example aspects, the annular flanges 2248 can define a substantially rectangular cross-sectional shape. In other aspects, the annular flanges 2248 can define any other suitable cross-sectional shape, including but not limited to, triangular. The force of fluid flowing through the fitting bore 1020 on the fitting gasket 2230 can be focused at radially inward ends of the annular flanges 2248 located along the gasket sealing surface 2238 thereby increasing the sealing pressure of annular flanges 2248 on the outer pipe surface 105 of the pipe segment 100.

Figure 17:
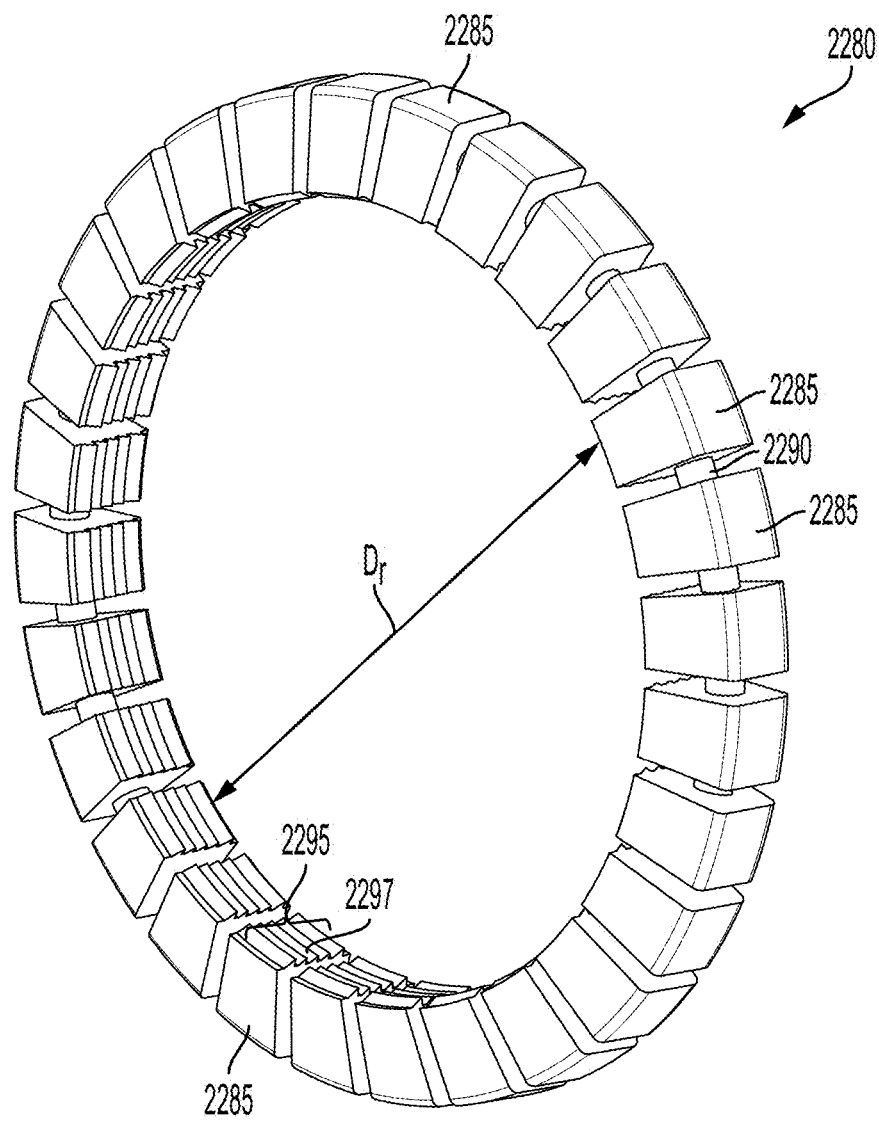
FIG. 17 is a perspective view of a grip ring in accordance with one aspect of the present disclosure.

FIG. 17 illustrates a grip ring 2280 according to another example aspect of the disclosure. The grip ring 2280 can be substantially annular and can be sectioned into a plurality of gripper pads 2285 in the present aspect. The gripper pads 2285 can be arranged circumferentially to define the annular grip ring 2280. Each of the gripper pads 2285 can be connected each adjacent gripper pad 2285 by a gripper spring 2290. The gripper springs 2290 extending between adjacent gripper pads can allow an inner ring diameter $D_r$ of the grip ring 2280 to contract when the grip ring 2280 becomes biased radially inward by the clamp body 1240.

Figure 18:
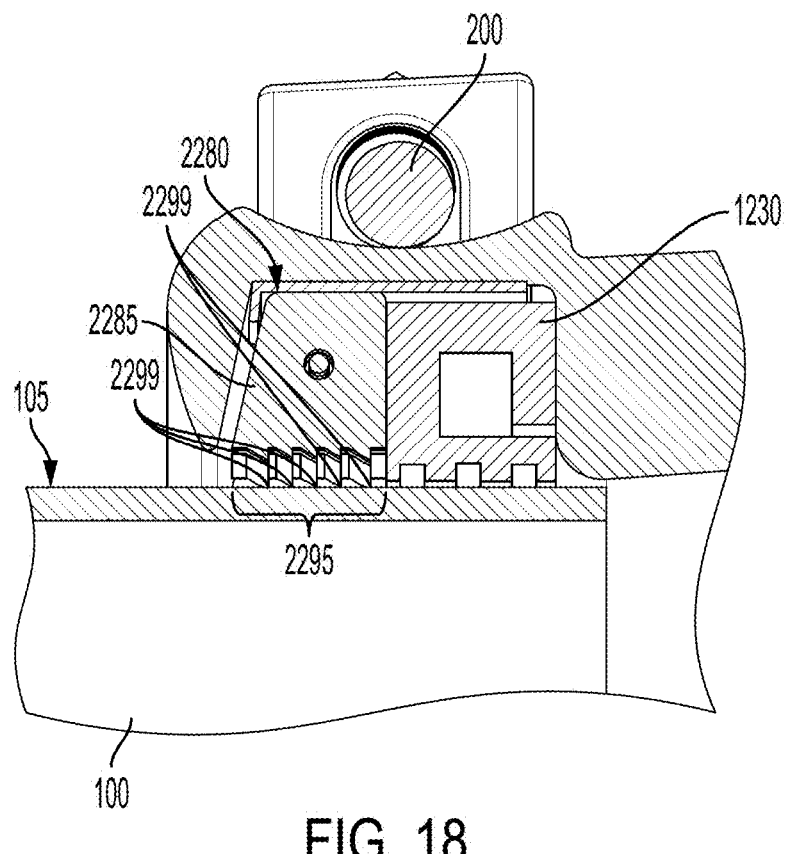
FIG. 18 is a cross-sectional view of the pipe segment assembled with a pipe fitting in accord with one aspect of the disclosure in the tightened configuration, taken along the section defined by line 12-12 in FIG. 1, wherein the pipe fitting comprises the grip ring of FIG. 17.

Each of the gripper pads 2285 can define a plurality of the gripping ridges 2295 formed by an inward gripper surface 2297 of each gripper pad. In some aspects, each of the gripping ridges 2295 can define a substantially triangular cross-section, as previously described. In other aspects, the gripping ridges 2295 can define any other suitable cross-sectional shape. As seen with reference to FIG. 18, when the gripper pads 2280 can be biased radially inwardly upon the tightening of the tightening fastener 200, a radially inward edge 2299 of each gripping ridge 2295 can engage and grip the outer pipe surface 105 of the corresponding pipe segment 100 to retain the pipe segment 100 within the fitting bore 1020.

Figure 19:
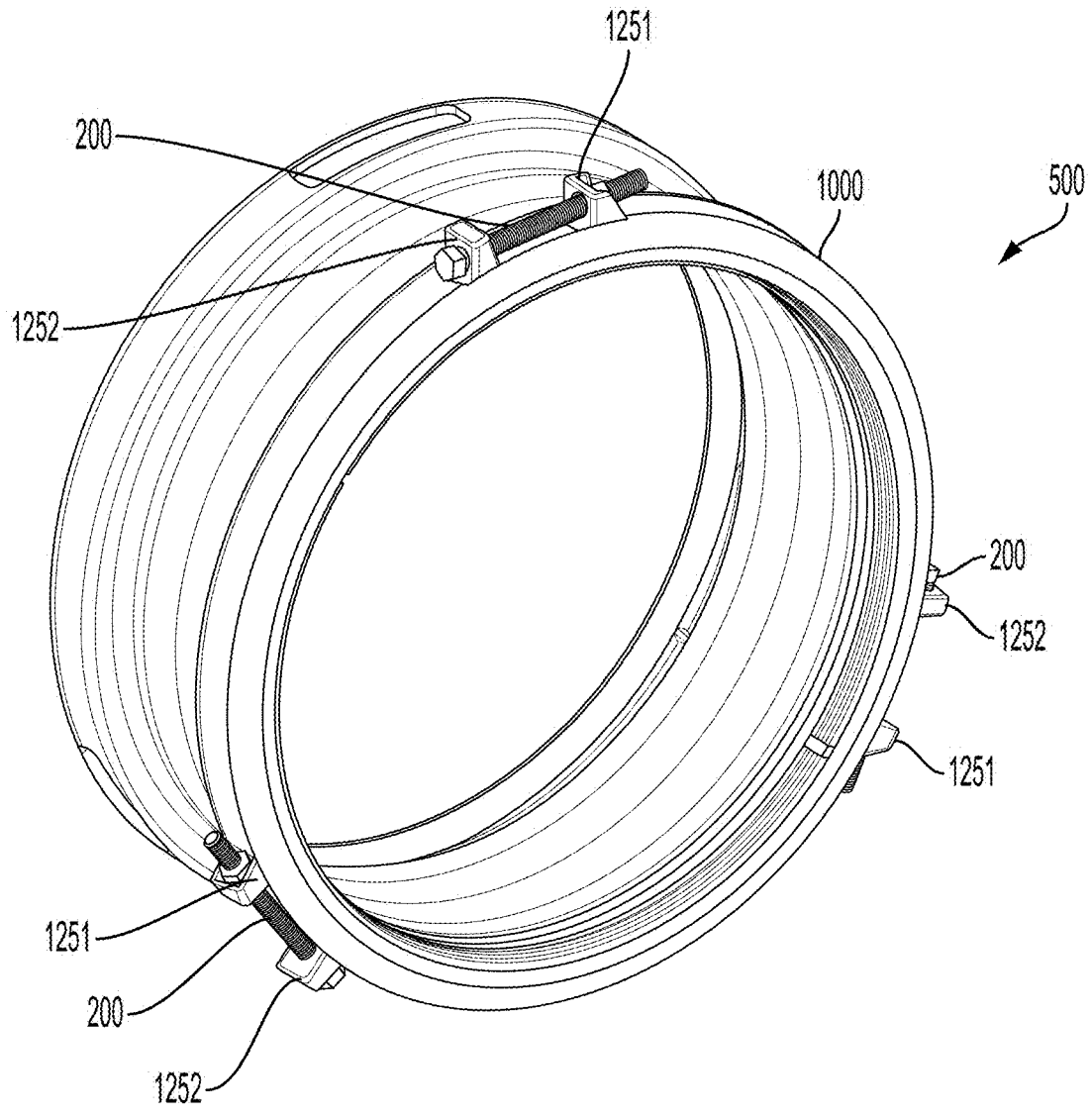
FIG. 19 is a perspective view of a pipe fitting in accord with one aspect of the present disclosure.
Figure 20:
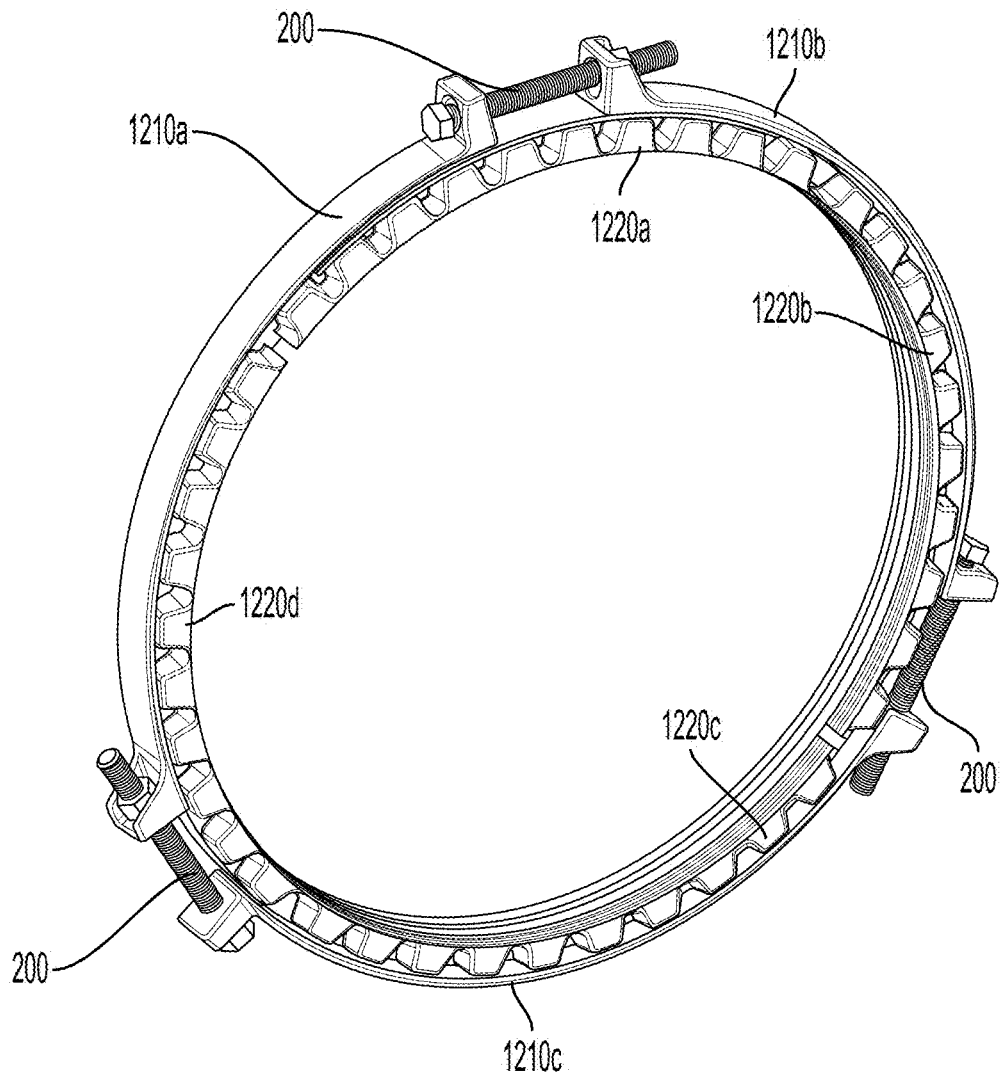
FIG. 20 is a perspective view of a clamp assembly of the pipe fitting of FIG. 19.

In various aspects, modifications to the features disclosed herein can be found. With reference to FIGS. 19-20, the pipe fitting 500 in various aspects can comprise a plurality of tightening fasteners 200 arranged at circumferentially disparate locations of the fitting body 1000. Each tightening fastener 200 can engage one first fastener catch 1251 and one second fastener catch 1252. As can be seen, the tightening fasteners 200 need not span any reinforcing ribs such as the upper reinforcing rib 1106 or the lower reinforcing rib 1107 seen with respect to prior aspects (see, e.g., FIG. 1). In various aspects, reinforcing ribs can be included.

The fitting clamp 1210 can be comprised of a plurality of fitting clamp segments 1210a, 1210b, 1210c in various aspects. Each fitting clamp segment 1210a, 1210b, 1210c can be connected to at least one of the other fitting clamp segments 1210a, 1210b, 1210c by the tightening fastener 200. In various aspects, various numbers and shapes of fitting clamp segments 1210a, 1210b, 1210c can be utilized depending on sizing of the pipe segment 100 and material constraints.

Similarly, the grip ring 1220 can comprise or be replaced by a plurality of gripping segments 1220a, 1220b, 1220c, 1220d. The gripping segments 1220a, 1220b, 1220c, 1220d can vary in number and can be arcuate to assist in replacing the grip ring 1220 shown and described with reference to varying aspects.

In various aspects, each clamp segment 1210a, 1210b, 1210c can be about the same size as each other. In various aspects, each gripping segments 1220a, 1220b, 1220c, 1220d can be of about the same size as each other. In various aspects, clamp segments 1210a, 1210b, 1210c can be of variant sizes and can differ from one another. In various aspects, gripping segments 1220a, 1220b, 1220c, 1220d can be of variant sizes and can differ from on another. One of skill in the art would understand that modifications to various designs to accommodate physical arrangements would be understood within the scope of the current disclosure.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pipe fitting comprising:
   a fitting body defining an inner body surface, an outer body surface, a first axial fitting end, and a second axial fitting end, the inner body surface defining a fitting bore extending from the first axial fitting end to the second axial fitting end, an assembly window extending through the fitting body from the outer body surface to the inner body surface; and
   a clamp assembly arranged at least partially within the fitting bore and comprising a fitting gasket and a fitting clamp, the fitting clamp comprising a first fastener catch, a second fastener catch, and a tightening fastener, each of the first fastener catch and the second fastener catch arranged within the assembly window;
   wherein:
       the fitting clamp defines a clamp void and the fitting gasket is arranged within the clamp void;
       the clamp assembly is configurable in an untightened configuration and a tightened configuration; and
       in the tightened configuration, the tightening fastener is tightened to draw the first fastener catch towards the second fastener catch.

2. The pipe fitting of claim 1, wherein each of the first fastener catch and the second fastener catch extend radially through the assembly window.

3. The pipe fitting of claim 1, wherein at least one reinforcing rib is arranged across the assembly window such that the assembly window is divided into a first window section and a second window section.

4. The pipe fitting of claim 3, wherein at least a portion of the first fastener catch is arranged within the first window section and wherein at least a portion the second fastener catch is arranged within the second window section.

5. The pipe fitting of claim 4, wherein the tightening fastener is arranged radially outside of the fitting body.

6. The pipe fitting of claim 1, wherein the fitting gasket comprises a gasket portion and a tear-away portion.

7. The pipe fitting of claim 1, wherein the fitting clamp comprises a plurality of fitting clamp segments.

8. The pipe fitting of claim 1, further comprising a grip ring arranged within clamp void.

9. The pipe fitting of claim 8, wherein the fitting clamp comprises a clamp body, the clamp body defining a first end and a second, wherein the first fastener catch is arranged at the first end and the second fastener catch is arranged at the second end.

10. The pipe fitting of claim 8, wherein the grip ring comprises a plurality of gripping segments.

11. The pipe fitting of claim 8, wherein the grip ring defines at least one outer surface and at least one inner surface, wherein at least one of the inner surfaces comprises a plurality of gripping teeth.

12. The pipe fitting of claim 11, wherein the grip ring is substantially C-shaped and defines a first circumferential end and a second circumferential end, wherein a gap is defined between the first circumferential end and the second circumferential end, and wherein the gap is configured to be smaller in the tightened configuration than in the untightened configuration.

13. The pipe fitting of claim 12, further comprising a washer, the washer arranged within the fitting clamp and contacting each of the fitting gasket and the grip ring.

14. A fitting body for use to join a clamp assembly to a pipe, the fitting body comprising:

a substantially cylindrical tubular body having an axis, a
first axial fitting end, and a second axial fitting end, the
body defining an outer body surface;
a fitting bore defined by the body, the fitting bore being
defined through an entirety of the body from the first
axial fitting end to the second axial fitting end, the
fitting bore defining an inner body surface of the body,
the body comprising at least one wall defined by the
inner body surface and the outer body surface;
at least one assembly window defined through the wall of
the body; and
a reinforcing rib;
wherein:
the body comprises an upper portion on one side of the
axis and a lower portion on another side of the axis,
wherein the assembly window is arranged on the
upper portion; and
the reinforcing rib crosses the assembly window such
that the assembly window is divided into a first
window section and a second window section.
15. The fitting body of claim 14, wherein an intermediate
reinforcing rib connects to a portion of the outer surface.
16. A pipe fitting comprising:
a fitting body defining a fitting bore and an assembly
window; and

20 a clamp assembly arranged at least partially within the
fitting bore and comprising:
a fitting clamp comprising a flexible C-shaped clamp
body, a first fastener catch, and a second fastener
catch, the clamp body defining a clamp void, the first
fastener catch and the second fastener catch extend-
ing radially outwardly through the assembly win-
dow;
a flexible C-shaped grip ring arranged within the clamp
void and defining a plurality of gripping ridges; and
a gasket arranged within the clamp void and defining a
gasket sealing surface.
17. The pipe fitting of claim 16, wherein the fitting body
defines a retention shoulder proximate an end of the fitting
body, wherein the fitting body defines an inner shoulder
axially apart from the retention shoulder, and wherein the
clamp assembly is arranged between the retention shoulder
and the inner shoulder.
18. The pipe fitting of claim 16, a retention rib crosses the
assembly window such that the assembly window is divided
into a first window section and a second window section.
19. The pipe fitting of claim 18, wherein the first fastener
catch is arranged within the first window section and
wherein the second fastener catch is arranged within the
second window section.

* * * * *